US010966177B2

(12) United States Patent
Li et al.

(10) Patent No.: US 10,966,177 B2
(45) Date of Patent: Mar. 30, 2021

(54) COMMUNICATION METHOD, TERMINAL DEVICE, AND ACCESS NETWORK DEVICE

(71) Applicant: Huawei Technologies Co., Ltd., Shenzhen (CN)

(72) Inventors: Bingzhao Li, Beijing (CN); Wei Quan, Beijing (CN); Jian Zhang, Beijing (CN); Xiaodong Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 29 days.

(21) Appl. No.: 16/272,558

(22) Filed: Feb. 11, 2019

(65) Prior Publication Data

US 2019/0223151 A1 Jul. 18, 2019

Related U.S. Application Data

(63) Continuation of application No. PCT/CN2016/094873, filed on Aug. 12, 2016.

(51) Int. Cl.
*H04W 68/02* (2009.01)
*H04W 76/27* (2018.01)
(Continued)

(52) U.S. Cl.
CPC ............ *H04W 68/02* (2013.01); *H04W 8/22* (2013.01); *H04W 36/0033* (2013.01);
(Continued)

(58) Field of Classification Search
CPC ..... H04W 68/02; H04W 76/28; H04W 76/11; H04W 76/27; H04W 8/22; H04W 8/24;
(Continued)

(56) References Cited

U.S. PATENT DOCUMENTS 10,542,580 B2 * 1/2020 Takahashi ............. H04W 76/27
2005/0197125 A1 9/2005 Kang et al.
(Continued)

FOREIGN PATENT DOCUMENTS

CN 1930793 A 3/2007
CN 101194471 A 6/2008
(Continued)

OTHER PUBLICATIONS

Huawei, et al., "On RAN initiated paging", 3GPP TSG-RAN WG2 Meeting #94, R2-163932, XP051105298, Nanjing, China, May 23-27, 2016, 5 pages.

(Continued)

*Primary Examiner* — Ayaz R Sheikh
*Assistant Examiner* — Louis Samara
(74) *Attorney, Agent, or Firm* — Slater Matsil, LLP

(57) ABSTRACT

Embodiments of this application provide a communication method including: determining, by a terminal device in a first state, that a paging area of the terminal device is changed; sending, by the terminal device, a first message to a first access network device, where the first message is used to notify the first access network device that the paging area of the terminal device is changed; receiving, by the terminal device, a second message sent by the first access network device based on the first message; determining, by the terminal device based on the second message, a to-be-entered state of the terminal device; and when the terminal device determines that the terminal device needs to be in a second state, entering, by the terminal device, the second state based on a stored connection context information.

18 Claims, 10 Drawing Sheets

(51) Int. Cl.
*H04W 68/00* (2009.01)
*H04W 8/22* (2009.01)
*H04W 76/28* (2018.01)
*H04W 76/11* (2018.01)
*H04W 36/00* (2009.01)
*H04W 60/04* (2009.01)

(52) U.S. Cl.
CPC ......... *H04W 68/00* (2013.01); *H04W 68/005* (2013.01); *H04W 76/11* (2018.02); *H04W 76/27* (2018.02); *H04W 76/28* (2018.02); *H04W 60/04* (2013.01)

(58) Field of Classification Search
CPC ............. H04W 36/0033; H04W 68/00; H04W 68/005; H04W 60/04
See application file for complete search history.

(56) References Cited

U.S. PATENT DOCUMENTS

| | | | |
|---|---|---|---|
| 2005/0232200 A1 | 10/2005 | Jeong et al. | |
| 2011/0053591 A1 | 3/2011 | Kubo et al. | |
| 2011/0053594 A1 | 3/2011 | Lim et al. | |
| 2012/0051288 A1* | 3/2012 | Dwyer | H04W 76/27 370/328 |
| 2015/0163637 A1* | 6/2015 | Castmo | H04W 4/021 455/456.1 |
| 2016/0205661 A1* | 7/2016 | Ryu | H04W 36/30 455/458 |

FOREIGN PATENT DOCUMENTS

| | | |
|---|---|---|
| CN | 104471996 A | 3/2015 |
| WO | 2016068777 A1 | 5/2016 |

OTHER PUBLICATIONS

3GPP TR 23.720 V13.0.0 (Mar. 2016), 3rd Generation Partnership Project;Technical Specification Group Services and System Aspects; Study on architecture enhancements for Cellular Internet of Things (Release 13), XP051086108, Mar. 2016, 98 pages.
Huawei et al., "New WI proposal: Signalling reduction to enable light connection for LTE", 3GPP TSG RAN Meeting #71, XP051658374, RP-160540, Gothenburg, Sweden, Mar. 7-10, 2016, 8 pages.
Huawei, et al., "Mobility notification for the lightly connected UE", 3GPP TSG-RAN2 Meeting #95, XP051133885, R2-165247, Gothenburg, Sweden, Aug. 22-26, 2016, 4 pages.
Huawei et al., "Low latency and low overhead transmission for NR", 3GPP TSG-RAN WG2 Meeting #93bis, XP051082246, R2-162662, Dubrovnik, Croatia, Apr. 11-15, 2016, 8 pages.
Nokia, "RRC Connection control procedures for NB-IoT UEs", 3GPP TSG-RAN WG4#78-NB-IoT, X051089344, R4-78AH-0162, Kista, SE, May 3-4, 2016, 4 pages.
3GPP TS 33.401 V13.3.0 (Jun. 2016); 3rd Generation Partnership Project; Technical Specification Group Services and System Aspects; 3GPP System Architecture Evolution (SAE); Security architecture (Release 13), XP051123425, 148 pages.
Samsung Electronics Co., Ltd., "Discussion on new state in 5G NR" [online], 3GPP TSG-RAN WG2 #94 R2-163830, May 14, 2016, 8 pages.
3GPP TS 36.331 v13.2.0:"3rd Generation Partnership Project;Technical Specification Group Radio Access Network; Evolved Universal Terrestrial Radio Access Network(E-UTRAN),Radio resource control(RRC)",Jun. 2016.
3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 V13.3.0 (Jun. 2016), 331 pages.

\* cited by examiner

400

```
┌─────────────────────────────────────────────────────────────┐
│ A first access network device receives a first message sent by a │
│ terminal device, where the first message is used to notify the first │ ~ 401
│ network device that a paging area of the terminal device is changed │
└─────────────────────────────────────────────────────────────┘
                              │
┌─────────────────────────────────────────────────────────────┐
│ The first access network device determines paging area      │
│ configuration information, where the paging area configuration │ ~ 402
│ information is used to update a paging area configuration for the │
│                     terminal device                         │
└─────────────────────────────────────────────────────────────┘
                              │
┌─────────────────────────────────────────────────────────────┐
│ The first access network device sends, to the terminal device, a │
│ second message that includes the paging area configuration  │ ~ 403
│                      information                            │
└─────────────────────────────────────────────────────────────┘
```

FIG. 4

COMMUNICATION METHOD, TERMINAL DEVICE, AND ACCESS NETWORK DEVICE

CROSS-REFERENCE TO RELATED APPLICATIONS

This application is a continuation of International Application No. PCT/CN2016/094873, filed on Aug. 12, 2016, the disclosure of which is hereby incorporated by reference in its entirety.

TECHNICAL FIELD

This application relates to the communications field, and more specifically, to a communication method, a terminal device, and an access network device.

BACKGROUND

In a Long Term Evolution (LTE)/System Architecture Evolution (SAE) system, a location of a terminal is managed using a tracking area update (TAU) process. A mobility management entity (MME) can know a tracking area (TA) in which a terminal device is located. The terminal device in an idle state can move freely in the TA without notifying the MME. When the terminal device in the idle state moves from one TA to another TA, location registration needs to be performed again in the new TA, to instruct the MME to change location information of the UE stored in the MME. This is a TAU process.

In the TAU process, the terminal device needs to send a radio resource control (RRC) connection setup request message to an access network device. After receiving the RRC connection setup request message, the access network device sends an RRC connection setup message to the terminal device. Then, the terminal device responds with an RRC connection setup complete message, and carries a non-access stratum (NAS) protocol data unit (PDU) to the RRC connection setup complete message. The NAS PDU includes TAU signaling. The NAS PDU is forwarded by the access network device to the MME, to notify the MME that the terminal device has left the TA. The MME sends TAU accept information to the terminal device through the access network device, and configures a new TA for the terminal device using the signaling. Because there are a plurality of pieces of signaling between the terminal device and the access network device and between the access network device and a core network device, signaling overheads are relatively high.

SUMMARY

Embodiments of this application provide a communication method, a terminal device, and an access network device, to reduce signaling overheads.

According to a first aspect, an embodiment of this application provides a communication method. The method includes determining, by a terminal device in a first state, that a paging area of the terminal device is changed, where the first state includes a state in which the terminal device monitors paging and has stored connection context information of the terminal device. The method also includes sending, by the terminal device, a first message to a first access network device, where the first message is used to notify the first access network device that the paging area of the terminal device is changed, and the first access network device is a serving access network device of the terminal device. The method also includes receiving, by the terminal device, a second message sent by the first access network device based on the first message. The method also includes determining, by the terminal device based on the second message, a to-be-entered state of the terminal device. The method also includes, when the terminal device determines that the to-be-entered state is a second state, entering, by the terminal device, the second state based on the stored connection context information, where the second state includes that the terminal device and the first access network device are connected.

Therefore, in this embodiment of this application, after leaving a configured paging area, the terminal device in the first state sends, to the first access network device, the first message that is used to notify the first access network device that the paging area of the terminal device is changed; and the terminal device determines, based on the second message sent by the first access network device, the to-be-entered state of the terminal device. When the terminal device needs to enter a connected state, the terminal device can directly enter the connected state based on the stored connection context information, without setting up another connection to an access network device. In this way, the terminal device can rapidly enter the connected state. In addition, the terminal device does not need to notify a core network device that the paging area of the terminal device is changed. This can reduce signaling between the access network device and the core network device, thereby reducing signaling overheads.

With reference to the first aspect, in a first possible implementation of the first aspect, the method further includes: remaining, by the terminal device, in the first state when the terminal device determines that the to-be-entered state is the first state.

With reference to the first possible implementation of the first aspect, in a second possible implementation of the first aspect, when the terminal device enters the second state based on the connection context information, the method further includes: sending, by the terminal device, a third message to the first access network device, where the third message is used to notify the first access network device that the terminal device has entered the second state.

With reference to the first or the second possible implementation of the first aspect, in a third possible implementation of the first aspect, when the terminal device determines to remain in the first state, the method further includes: sending, by the terminal device, a fourth message to the first access network device based on the stored context information, where the fourth message is used to indicate that the terminal device has received the second message.

With reference to any one of the first to the third possible implementations of the first aspect, in a fourth possible implementation of the first aspect, the terminal device sends the first message to the first access network device using a first signaling channel of a common channel, and the terminal device receives, using a second signaling channel of a dedicated channel, the second message sent by the first access network device.

With reference to any one of the first to the fourth possible implementations of the first aspect, in a fifth possible implementation of the first aspect, the terminal device activates the second signaling channel based on a signaling channel parameter saved in the connection context information of the terminal device, and receives the second message using the second signaling channel.

With reference to any one of the first to the fifth possible implementations of the first aspect, in a sixth possible implementation of the first aspect, the determining, by the terminal device based on the second message, a to-be-entered state of the terminal device includes: determining, by the terminal device based on a type of the second message and/or content carried in the second message, the to-be-entered state of the terminal device.

With reference to the sixth possible implementation of the first aspect, in a seventh possible implementation of the first aspect, the content carried in the second message includes state indication information and/or paging area configuration information; and the state indication information is used to indicate the to-be-entered state of the terminal device, and the paging area configuration information is used to update a paging area configuration for the terminal device.

With reference to either the sixth or the seventh possible implementation of the first aspect, in an eighth possible implementation of the first aspect, a type of the first message is an RRC connection resume request message, and the RRC connection resume request message is used to request to resume an RRC connection to the first access network device; and the type of the second message is an RRC connection resume message or an RRC connection reject message, where the RRC connection resume message is used to instruct the terminal device to resume the RRC connection, and the RRC connection reject message is used to indicate that the first access network device rejects resuming of the RRC connection.

In addition, when the terminal device needs to enter the second state, the terminal device can rapidly enter the connected state by accepting the RRC connection resume message.

With reference to the eighth possible implementation of the first aspect, in a ninth possible implementation of the first aspect, a cause value in the RRC connection resume request message indicates that the paging area of the terminal device is changed.

Therefore, in this embodiment of this application, the first message is an RRC connection resume request message, so that an existing message format can be effectively used, and without a change in an existing protocol, the first access network device can be notified that the paging area of the terminal device is changed.

With reference to either the eighth or the ninth possible implementation of the first aspect, in a tenth possible implementation of the first aspect, the determining, by the terminal device based on a type of the second message and/or content carried in the second message, the to-be-entered state of the terminal device includes: when the type of the second message is an RRC connection reject message, determining, by the terminal device, that the to-be-entered state is the first state; when the type of the second message is an RRC connection resume message, determining, by the terminal device, that the to-be-entered state is the second state; when the type of the second message is an RRC connection resume message and the content carried in the second message is used to indicate that the to-be-entered state of the terminal device is the first state, determining, by the terminal device, that the terminal device needs to be in the first state; and when the type of the second message is an RRC connection resume message and the content carried in the second message is used to instruct the terminal device to be in the second state, determining, by the terminal device, that the to-be-entered state is the second state.

With reference to the tenth possible implementation of the first aspect, in an eleventh possible implementation of the first aspect, the type of the second message is an RRC connection resume message; and the method further includes: when the terminal device determines, based on the RRC connection resume message, that the to-be-entered state is the first state, ignoring, by the terminal device, an encryption parameter used to resume the RRC connection in the RRC connection resume message.

Therefore, when determining that the terminal device needs to be in the first state, the terminal device may ignore the encryption parameter and remain in the first state. In this way, it can be avoided that the terminal device enters the connected state based on the encryption parameter even when determining to remain in the first state.

With reference to the tenth possible implementation of the first aspect, in a twelfth possible implementation of the first aspect, the second message is an RRC connection reject message; and the method further includes: when the terminal device determines, based on the RRC connection reject message, that the to-be-entered state is the first state, ignoring, by the terminal device, wait time information included in the RRC connection reject message, where the wait time information is used to indicate a wait time required for resuming the RRC connection between the terminal device and the first access network device; and when the RRC connection reject message responds to the RRC connection resume request message that is used to request to resume the RRC connection to the first access network device, starting, by the terminal device, a timer based on the wait time information included in the RRC connection reject information, to remain in the first state within the timer.

Therefore, in this embodiment of this application, when the second message is an RRC connection resume message or an RRC connection reject message, an existing message can also be fully used to indicate the to-be-entered state of the terminal device.

In addition, when the terminal device needs to enter the second state, the terminal device can rapidly enter the connected state by accepting the RRC connection resume message.

With reference to the first aspect or any possible implementation of the first aspect, in a thirteenth possible implementation of the first aspect, before the determining, by the terminal device in the first state, that a paging area of the terminal device is changed, the method further includes: receiving instruction information sent by a second access network device, where the instruction information is used to instruct the terminal device to enter the first state, and the instruction information includes paging area configuration information used to configure a paging area for the terminal device.

According to a second aspect, an embodiment of this application provides a communication method. The method includes receiving, by a first access network device, a first message sent by a terminal device in a first state, where the first message is used to notify the first access network device that a paging area of the terminal device is changed, and the first state includes a state in which the terminal device monitors paging and has stored connection context information of the terminal device. The method also includes obtaining, by the first access network device, the connection context information of the terminal device from a second access network device, where the second access network device is an access network device corresponding to a cell included in a paging area configured for the terminal device or is a predetermined access network device that is configured to store the connection context information of the terminal device. The method also includes determining, by the first access network device, a to-be-entered state of the terminal device. The method also includes, when the first access network device determines that the to-be-entered state is a second state, sending, by the first access network device to the terminal device based on the connection context information of the terminal device, a second message that is used to instruct the terminal device to enter the second state.

Therefore, in this embodiment of this application, after leaving a configured paging area, the terminal device in the first state sends, to the first access network device, the first message that is used to notify the first access network device that the paging area of the terminal device is changed; and the terminal device determines, based on the second message sent by the first access network device, the to-be-entered state of the terminal device. When the terminal device needs to enter a connected state, the terminal device can directly enter the connected state based on the stored connection context information, without setting up another connection to an access network device. In this way, the terminal device can rapidly enter the connected state.

In addition, the first access network device obtains the connection context information from the second access network device, so that the first access network device can rapidly set up a connection to the terminal device based on the connection context when determining that the terminal device needs to enter the second state.

With reference to the second aspect, in a first possible implementation of the second aspect, the method further includes: when the first access network device determines that the to-be-entered state is the first state, sending, by the first access network device to the terminal device, a second message that is used to instruct the terminal device to remain in the first state.

With reference to the first possible implementation of the second aspect, in a second possible implementation of the second aspect, after the sending, by the first access network device to the terminal device based on the connection context information of the terminal device, a second message that is used to instruct the terminal device to enter the second state, the method further includes: receiving, by the first access network device, a third message sent by the terminal device, where the third message is used to notify the first access network device that the terminal device has entered the second state.

With reference to the first or the second possible implementation of the second aspect, in a third possible implementation of the second aspect, after the sending, by the first access network device to the terminal device, a second message that is used to instruct the terminal device to remain in the first state, the method further includes: receiving, by the first access network device, a fourth message sent by the terminal device based on the stored context information, where the fourth message is used to indicate that the terminal device has received the second message.

With reference to any one of the first to the third possible implementations of the second aspect, in a fourth possible implementation of the second aspect, the first access network device receives, using a first signaling channel of a common channel, the first message sent by the terminal device, and the first access network device sends the second message to the terminal device using a second signaling channel of a dedicated channel.

With reference to any one of the first to the fourth possible implementations of the second aspect, in a fifth possible implementation of the second aspect, the first access network device activates the second signaling channel based on the connection context information of the terminal device, and sends the second message to the terminal device using the second signaling channel.

With reference to any one of the first to the fifth possible implementations of the second aspect, in a sixth possible implementation of the second aspect, the first message further includes identifier information of the second access network device, and the second access network device has stored the context information of the terminal device; and the obtaining, by the first access network device, the connection context information of the terminal device from a second access network device includes: determining, by the first access network device, the second access network device based on the identifier information of the second access network device; sending, by the first access network device to the second access network device, a request message that is used to request the connection context information of the terminal device; and receiving, by the first access network device, the connection context information of the terminal device that is sent by the second access network device.

Therefore, the first access network device obtains the connection context information of the terminal device from the second access network device, so that the first access network device can rapidly resume a connection to the terminal device based on the connection context of the terminal device when determining that the terminal device needs to be in the second state.

With reference to any one of the first to the sixth possible implementations of the second aspect, in a seventh possible implementation of the second aspect, the second message indicates the to-be-entered state of the terminal device using a type and/or content of the second message.

With reference to the seventh possible implementation of the second aspect, in an eighth possible implementation of the second aspect, the content carried in the second message includes state indication information and/or paging area configuration information; and the state indication information is used to indicate the to-be-entered state of the terminal device, and the paging area configuration information is used to update a paging area configuration for the terminal device.

With reference to the eighth possible implementation of the second aspect, in a ninth possible implementation of the second aspect, a type of the first message is an RRC connection resume request message, and the RRC connection resume request message is used to request to resume an RRC connection to the first access network device; and the type of the second message is an RRC connection resume message or an RRC connection reject message, where the RRC connection resume message is used to instruct the terminal device to resume the RRC connection, and the RRC connection reject message is used to indicate that the first access network device rejects resuming of the RRC connection.

With reference to the ninth possible implementation of the second aspect, in a tenth possible implementation of the second aspect, a cause value in the RRC connection resume request message indicates that the paging area of the terminal device is changed.

With reference to the ninth or the tenth possible implementation of the second aspect, in an eleventh possible implementation of the second aspect, the second message whose message type is an RRC connection reject message is used to instruct the terminal device to remain in the first state; the second message whose message type is an RRC connection resume message and that carries content that instructs the terminal device to enter the first state is used to instruct the terminal device to remain in the first state; the second message whose message type is an RRC connection resume message is used to instruct the terminal device to enter the second state; and the second message whose message type is an RRC connection resume message and that carries content that is used to instruct the terminal device to enter the second state is used to instruct the terminal device to enter the second state.

With reference to any one of the eighth to the eleventh possible implementations of the second aspect, in a twelfth possible implementation of the second aspect, before the sending, to the terminal device, the second message that carries the paging area configuration information, the method further includes: sending, by the first access network device, information about a candidate cell to the second access network device; receiving, by the first access network device, information about a selected cell that is sent by the second access network device; and generating, by the first access network device, the paging area configuration information based on the information about the selected cell.

With reference to any one of the eighth to the eleventh possible implementations of the second aspect, in a thirteenth possible implementation of the second aspect, before the sending, to the terminal device, the second message that carries the paging area configuration information, the method further includes: sending, by the first access network device, a first instruction message to the second access network device, where the first instruction message carries identifier information of the terminal device to instruct the second access network device to send a paging area configuration requirement parameter of the terminal device to the first access network device; receiving, by the first access network device, the paging area configuration requirement parameter of the terminal device that is sent by the second access network device; and based on the paging area configuration requirement parameter of the terminal device, determining, by the first access network device, a cell included in a paging area that is to be configured for the terminal device, and generating the paging area configuration information.

With reference to the thirteenth possible implementation of the second aspect, in a fourteenth possible implementation of the second aspect, after the first access network device generates the paging area configuration information based on the paging area configuration requirement parameter of the terminal device, the first access network device sends the paging area configuration information to the second access network device. In this way, after receiving paging information for paging the terminal device, the second access network device can page the terminal device in a cell included in a paging area determined based on the paging area configuration information.

According to a third aspect, an embodiment of this application provides a communication method. The method includes receiving, by a second access network device, a first instruction message sent by a first access network device, where the first instruction message carries identifier information of a terminal device to request connection context information of the terminal device, the first instruction message is sent by the first access network device after receiving a first message, the first message is used to notify the first access network device that a paging area of the terminal device in a first state is changed, the first access network device is a serving access network device of the terminal device, and the first state includes a state in which the terminal device monitors paging and has stored the connection context information of the terminal device. The method also includes determining, by the second access network device, the connection context information of the terminal device based on the identifier information of the terminal device. The method also includes sending, by the second access network device, a context transfer message to the first access network device, where the context transfer message includes the connection context information of the terminal device.

With reference to the third aspect, in a first possible implementation of the third aspect, before the receiving, by a second access network device, a first instruction message sent by a first access network device, the method further includes: when the terminal device is located in a cell of the second access network device, sending, by the second access network device to the terminal device, information that instructs to enter the first state.

With reference to the third aspect or the first possible implementation of the third aspect, in a second possible implementation of the third aspect, the method further includes: receiving, by the second access network device, information about a candidate cell that is sent by the first access network device; determining, by the second access network device, a selected cell based on the candidate cell; and sending, by the second access network device, information about the selected cell to the first access network device.

With reference to the third aspect or the first possible implementation of the third aspect, in a third possible implementation of the third aspect, the method further includes: receiving, by the second access network device, first instruction information sent by the first access network device, where the first instruction message carries the identifier information of the terminal device to instruct the second access network device to send a paging area configuration requirement parameter of the terminal device to the first access network device; determining, by the second access network device, the paging area configuration requirement parameter of the terminal device; and sending, by the second access network device, the paging area configuration requirement parameter of the terminal device to the first access network device.

With reference to the third possible implementation of the third aspect, in a fourth possible implementation of the third aspect, the method further includes: receiving, by the second access network device, paging area configuration information that is generated based on the paging area configuration requirement parameter of the terminal device and sent by the first access network device.

According to a fourth aspect, an embodiment of this application provides a communication method. The method includes receiving, by a first access network device, a first message sent by a terminal device, where the first message is used to notify the first access network device that a paging area of the terminal device is changed. The method also includes determining, by the first access network device, paging area configuration information, where the paging area configuration information is used to update a paging area configuration for the terminal device. The method also includes sending, by the first access network device to the terminal device, a second message that includes the paging area configuration information.

Therefore, the first access network device knows a cell included in a paging area in which the terminal device is located, so that after receiving paging information for paging the terminal device, the first access network device can page the terminal device in the cell included in the paging area determined based on the paging area configuration information, and a core network device does not need to know the paging area in which the terminal device is located.

With reference to the fourth aspect, in a first possible implementation of the fourth aspect, the determining, by the first access network device, paging area configuration information includes: sending, by the first access network device, an instruction message to a second access network device, where the instruction message carries identifier information of the terminal device to instruct the second access network device to send information used to determine the paging area configuration information to the first access network device; receiving, by the first access network device, the information that is used to determine the paging area configuration information and sent by the second access network device; and determining, by the first access network device, the paging area configuration information based on the information used to determine the paging area configuration information.

With reference to the first possible implementation of the fourth aspect, in a second possible implementation of the fourth aspect, the sending, by the first access network device, an instruction message to a second access network device includes: sending, by the first access network device to the second access network device, the instruction message that carries information about a candidate cell, to instruct the second access network device to determine a selected cell from the candidate cell, where the selected cell is used to determine the paging area configuration information; the receiving, by the first access network device, the information that is used to determine the paging area configuration information and sent by the second access network device includes: receiving, by the first access network device, information about the selected cell that is sent by the second access network device; and the determining, by the first access network device, the paging area configuration information based on the information used to determine the paging area configuration information includes: determining, by the first access network device, the selected cell as a cell included in a paging area that is to be configured for the terminal device, and generating the paging area configuration information.

With reference to the first possible implementation of the fourth aspect, in a third possible implementation of the fourth aspect, the sending, by the first access network device, an instruction message to a second access network device includes: sending, by the first access network device, the instruction information to the second access network device, to instruct the second access network device to determine to send a paging area configuration requirement parameter of the terminal device to the first access network device, where the paging area configuration requirement parameter is used to determine the paging area configuration information; the receiving, by the first access network device, the information that is used to determine the paging area configuration information and sent by the second access network device includes: receiving, by the first access network device, the paging area configuration requirement parameter of the terminal device that is sent by the second access network device; and the determining, by the first access network device, the paging area configuration information based on the information used to determine the paging area configuration information includes: based on the paging area configuration requirement parameter of the terminal device, determining, by the first access network device, a cell included in a paging area that is to be configured for the terminal device, and generating the paging area configuration information.

With reference to the third possible implementation of the fourth aspect, in a fourth possible implementation of the fourth aspect, after the first access network device generates the paging area configuration information based on the paging area configuration requirement parameter of the terminal device, the first access network device sends the paging area configuration information to the second access network device. In this way, after receiving paging information for paging the terminal device, the second access network device can page the terminal device in a cell included in a paging area determined based on the paging area configuration information.

According to a fifth aspect, an embodiment of this application provides a communication method. The method includes receiving, by a second access network device, an instruction message sent by a first access network device, where the instruction message carries identifier information of the terminal device, and the instruction information is used to instruct the second access network device to send information used to determine paging area configuration information to the first access network device. The method also includes determining, by the second access network device, the information used to determine the paging area configuration information. The method also includes sending, by the second access network device, the information used to determine the paging area configuration information to the first access network device.

With reference to the fifth aspect, in a first possible implementation of the fifth aspect, the receiving, by a second access network device, instruction information sent by a first access network device includes: receiving, by the second access network device, the instruction message that carries information about a candidate cell and that is sent by the first access network device, where the instruction message is used to instruct the second access network device to determine a selected cell from the candidate cell; the determining, by the second access network device, the information used to determine the paging area configuration information includes: determining, by the second access network device, the selected cell based on the candidate cell; and the sending, by the second access network device, the information used to determine the paging area configuration information to the first access network device includes: sending, by the second access network device, information about the selected cell to the first access network device.

With reference to the fifth aspect, in a second possible implementation of the fifth aspect, the receiving, by a second access network device, an instruction message sent by a first access network device includes: receiving, by the second access network device, the instruction information sent by the first access network device, where the instruction message is used to instruct the second access network device to determine to send a paging area configuration requirement parameter of the terminal device to the first access network device; the determining, by the second access network device, the information used to determine the paging area configuration information includes: determining, by the second access network device, the paging area configuration requirement parameter of the terminal device; and the sending, by the second access network device, the information used to determine the paging area configuration information to the first access network device includes: sending, by the second access network device, the paging area configuration requirement parameter of the terminal device to the first access network device.

With reference to the second possible implementation of the fifth aspect, in a third possible implementation of the fifth aspect, the method further includes: receiving, by the second access network device, the paging area configuration information that is generated based on the paging area configuration requirement parameter of the terminal device and sent by the first access network device.

According to a sixth aspect, an embodiment of this application provides a terminal device, configured to perform the method according to the first aspect or any possible implementation of the first aspect. Specifically, the terminal device includes modular units that are configured to perform the method according to the first aspect or any possible implementation of the first aspect.

According to a seventh aspect, an embodiment of this application provides an access network device, configured to perform the method according to the second aspect or any possible implementation of the second aspect. Specifically, the access network device includes modular units that are configured to perform the method according to the second aspect or any possible implementation of the second aspect.

According to an eighth aspect, an embodiment of this application provides an access network device, configured to perform the method according to the third aspect or any possible implementation of the third aspect. Specifically, the access network device includes modular units that are configured to perform the method according to the third aspect or any possible implementation of the third aspect.

According to a ninth aspect, an embodiment of this application provides an access network device, configured to perform the method according to the fourth aspect or any possible implementation of the fourth aspect. Specifically, the access network device includes modular units that are configured to perform the method according to the fourth aspect or any possible implementation of the fourth aspect.

According to a tenth aspect, an embodiment of this application provides an access network device, configured to perform the method according to the fifth aspect or any possible implementation of the fifth aspect. Specifically, the access network device includes modular units that are configured to perform the method according to the fifth aspect or any possible implementation of the fifth aspect.

According to an eleventh aspect, an embodiment of this application provides a terminal device, configured to perform the method according to the first aspect or any possible implementation of the first aspect. The terminal device includes a processor, a memory, a receiver, and a transmitter. The memory is configured to store an uplink resource scheduling instruction. The processor is configured to execute the instruction stored in the memory, and is driven by the instruction to perform the following scheduling operation: determining that a paging area of the terminal device in a first state is changed, where the first state includes a state in which the terminal device monitors paging and has stored connection context information of the terminal device.

The transmitter is configured to send a first message to a first access network device, where the first message is used to notify the first access network device that the paging area of the terminal device is changed, and the first access network device is a serving access network device of the terminal device.

The receiver is configured to receive a second message sent by the first access network device based on the first message.

The processor is further configured to determine, based on the second message received by the receiving module, a to-be-entered state of the terminal device.

The processor is further configured to: when the processor determines that the to-be-entered state is a second state, enter the second state based on the stored connection context information, where the second state includes that the terminal device and the first access network device are connected.

According to a twelfth aspect, an embodiment of this application provides an access network device, configured to perform the method according to the second aspect or any possible implementation of the second aspect. The access network device includes a processor, a memory, a receiver, and a transmitter. The memory is configured to store an uplink resource scheduling instruction. The processor is configured to execute the instruction stored in the memory, and is driven by the instruction to perform a scheduling operation. The receiver is configured to receive a first message sent by a terminal device in a first state, where the first message is used to notify the access network device that a paging area of the terminal device is changed, and the first state includes a state in which the terminal device monitors paging and has stored connection context information of the terminal device.

The receiver is further configured to obtain the connection context information of the terminal device from a second access network device, where the second access network device is an access network device corresponding to a cell included in a paging area configured for the terminal device or is a predetermined access network device that is configured to store the connection context information of the terminal device.

The processor is configured to determine a to-be-entered state of the terminal device.

The transmitter is configured to: when it is determined that the to-be-entered state is a second state, send, to the terminal device based on the connection context information of the terminal device, a second message that is used to instruct the terminal device to enter the second state.

According to a thirteenth aspect, an embodiment of this application provides an access network device, configured to perform the method according to the third aspect or any possible implementation of the third aspect. The access network device includes a processor, a memory, a receiver, and a transmitter. The memory is configured to store an uplink resource scheduling instruction. The processor is configured to execute the instruction stored in the memory, and is driven by the instruction to perform a scheduling operation. The receiver is configured to receive a first instruction message sent by a first access network device, where the first instruction message carries identifier information of a terminal device to request connection context information of the terminal device, the first instruction message is sent by the first access network device after receiving a first message, the first message is used to notify the first access network device that a paging area of the terminal device in a first state is changed, the first access network device is a serving access network device of the terminal device, and the first state includes a state in which the terminal device monitors paging and has stored the connection context information of the terminal device.

The processor is configured to determine the connection context information of the terminal device based on the identifier information of the terminal device.

The transmitter is configured to send a context transfer message to the first access network device, where the context transfer message includes the connection context information of the terminal device.

According to a fourteenth aspect, an embodiment of this application provides an access network device, configured to perform the method according to the fourth aspect or any possible implementation of the fourth aspect. The access network device includes a processor, a memory, a receiver, and a transmitter. The memory is configured to store an uplink resource scheduling instruction. The processor is configured to execute the instruction stored in the memory, and is driven by the instruction to perform a scheduling operation. The receiver is configured to receive a first message sent by a terminal device, where the first message is used to notify the access network device that a paging area of the terminal device is changed.

The processor is configured to determine paging area configuration information, where the paging area configuration information is used to update a paging area configuration for the terminal device.

The transmitter is configured to send, to the terminal device, a second message that includes the paging area configuration information.

According to a fifteenth aspect, an embodiment of this application provides an access network device, configured to perform the method according to the fifth aspect or any possible implementation of the fifth aspect. The access network device includes a processor, a memory, a receiver, and a transmitter. The memory is configured to store an uplink resource scheduling instruction. The processor is configured to execute the instruction stored in the memory, and is driven by the instruction to perform a scheduling operation. The receiver is configured to receive an instruction message sent by a first access network device, where the instruction message carries identifier information of the terminal device, and the instruction information is used to instruct the access network device to send information used to determine paging area configuration information to the first access network device.

The processor is configured to determine the information used to determine the paging area configuration information.

The transmitter is configured to send the information used to determine the paging area configuration information to the first access network device.

According to a sixteenth aspect, an embodiment of this application provides a computer readable medium, configured to store a computer program. The computer program includes instructions used to perform the method according to the first aspect or any possible implementation of the first aspect, the second aspect or any possible implementation of the second aspect, the third aspect or any possible implementation of the third aspect, the fourth aspect or any possible implementation of the fourth aspect, or the fifth aspect or any possible implementation of the fifth aspect.

BRIEF DESCRIPTION OF THE DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and a person of ordinary skill in the art may still derive other accompanying drawings from these accompanying drawings without creative efforts.

FIG. 4 is a schematic flowchart of a communication method according to an embodiment of this application;

DETAILED DESCRIPTION OF ILLUSTRATIVE EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

It should be understood that the technical solutions in the embodiments of this application may be applied to various communications systems such as a Global System for Mobile Communications (GSM), a Code Division Multiple Access (CDMA) system, a Wideband Code Division Multiple Access (WCDMA) system, a Long Term Evolution LTE system, an LTE frequency division duplex (FDD) system, an LTE Time Division Duplex (TDD) system, a Universal Mobile Telecommunications System (UMTS), and a future 5th Generation (5G) communications system.

This application describes the embodiments with reference to a terminal device. The terminal device may also be referred to as user equipment (UE), an access terminal, a subscriber unit, a subscriber station, a mobile station, a mobile, a remote station, a remote terminal, a mobile device, a user terminal, a terminal, a wireless communications device, a user agent, or a user apparatus. The access terminal may be, for example, a cellular phone, a cordless phone, a Session Initiation Protocol (SIP) phone, a wireless local loop (WLL) station, a personal digital assistant (PDA), a handheld device with a wireless communication function, a computing device or another processing device connected to a wireless modem, an in-vehicle device, a wearable device, a terminal device in a future 5G network, or a terminal device in a future evolved public land mobile network (PLMN).

This application describes the embodiments with reference to an access network device. The access network device may be a device that is configured to communicate with the terminal device. For example, the access network device may be a combination of a base transceiver station (BTS) and a base station controller (BSC) in a GSM or CDMA system, may be a combination of a NodeB (NB) and a radio network controller (RNC) in a WCDMA system, or may be an evolved NodeB (eNB or eNodeB) in an LTE system. Alternatively, the network device may be a relay node, an access point, an in-vehicle device, a wearable device, an access network device (for example, a next-generation base station) in a future 5G network, an access network device in a future evolved PLMN network, or the like.

Figure 1:
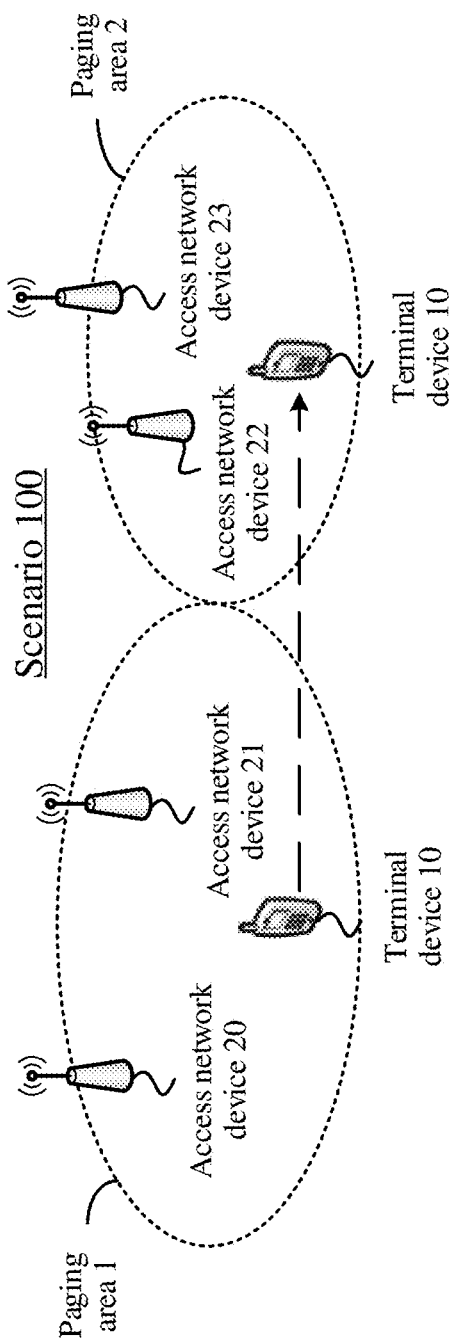
FIG. 1 is a schematic architectural diagram of a use scenario of the embodiments of this application.

FIG. 1 is a schematic architectural diagram of a use scenario 100 of the embodiments of this application. As shown in FIG. 1, a cell of an access network device 20 and a cell of an access network device 21 form a paging area 1, and a cell of an access network device 22 and a cell of an access network device 23 form a paging area 2.

When a terminal device 10 is located in the paging area 1, the access network device 20 or 21 (or another device, for example, an MME) may perform paging area configuration for the terminal device 10, for example, notify the terminal device 10 of the cells included in the paging area 1 in which the terminal device 10 is located. When the terminal device moves within the paging area 1, the terminal device does not need to report its location to the access network device.

After the terminal device 10 moves from the paging area 1 to the paging area 2, when the terminal device 10 finds that a current cell is not included in the cells included in the original paging area 1, the terminal device 10 may notify, through a current serving access network device, the access network device in the paging area 1 that has performed paging area configuration for the terminal device 10 that the terminal device 10 has left the paging area 1, or in other words, that the paging area is changed. For example, if the terminal device 10 moves from the cell of the access network device 21 to the cell of the access network device 22, the access network device 21 is the access network device that has performed paging area configuration for the terminal device 10. In this case, the terminal device 10 needs to notify, through the current access network device 22, the access network device 21 that the terminal device 10 has left the paging area 1. An access network device (or another device, for example, an MME) in the paging area 2 may perform paging area configuration for the terminal device 10 or set up a connection to the terminal device.

In the embodiments of this application, the paging area is a name for a cell set. The cell set is managed by an access network device. When moving within the paging area formed by the cell set, a terminal device does not need to notify the access network device; and when moving out of the cell set, the terminal device needs to notify the access network device. When the access network device in the paging area needs to communicate with the terminal device, the access network device in the paging area needs to page the terminal device in all cells included in the paging area. Therefore, in the embodiments of this application, the cell set is referred to as a paging area.

In the embodiments of this application, the cell set is referred to as a paging area. However, the embodiments of this application are not limited thereto. For example, the cell set may alternatively be referred to as a terminal device registration area, or an access network registration area or an access network tracking area of a terminal device.

Figure 2:
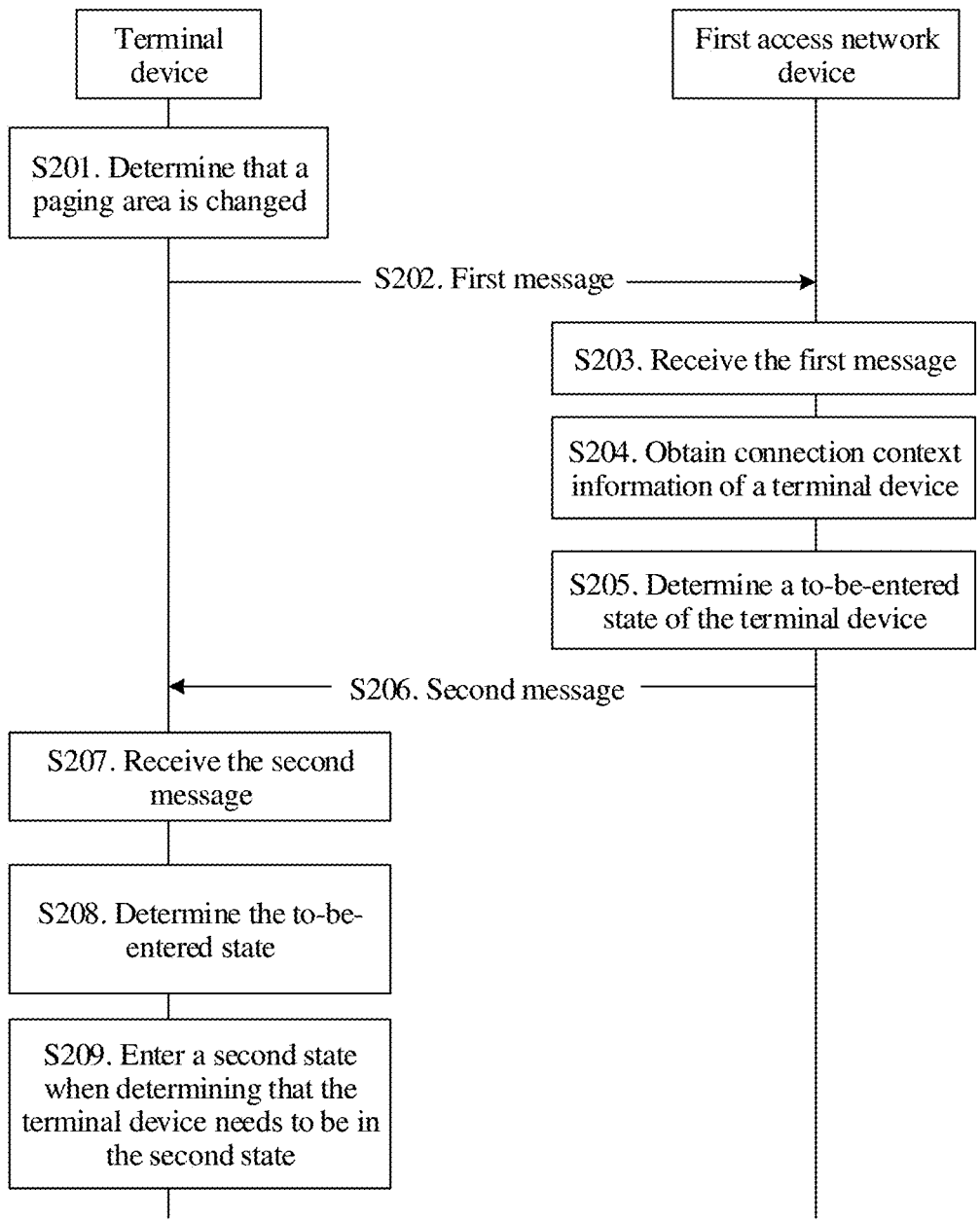
FIG. 2 is a schematic flowchart of a communication method according to an embodiment of this application.

FIG. 2 is a schematic flowchart of a communication method 200 according to an embodiment of this application. The method 200 may be applied to the scenario shown in FIG. 1, and certainly, may also be applied to other communication scenarios. This is not specially limited in this embodiment of this application.

In S201, a terminal device in a first state determines that a paging area of the terminal device is changed, where the first state includes a state in which the terminal device monitors paging and has stored connection context information of the terminal device.

Optionally, in this embodiment of this application, the terminal device may determine, based on a paging area configuration parameter stored in the terminal device, that the paging area of the terminal device is changed. In other words, the terminal device may determine that the terminal device has left a configured paging area.

For example, the terminal device knows that a paging area configured for the terminal device includes a cell 1, a cell 2, and a cell 3. When leaving the configured paging area and entering a cell 4, the terminal device determines that the cell 4 is not included in the cells included in the paging area configured for the terminal device. In this case, the terminal device determines that the paging area of the terminal device is changed.

For another example, the terminal device knows that a paging area identifier of a paging area configured for the terminal device is 1, and the paging area whose identifier is 1 includes a cell 1, a cell 2, and a cell 3. When entering a cell 4, the terminal device determines that a paging area identifier of a paging area to which the cell 4 belongs is 2. In this case, the terminal device determines that the paging area of the terminal device is changed.

Optionally, in this embodiment of this application, the first state includes the state in which the terminal device monitors paging and has stored the connection context information of the terminal device. When the terminal device is paged or needs to transmit uplink data or signaling, the terminal device can rapidly enter a connected state based on the connection context information.

In this embodiment of this application, the state in which the terminal device monitors paging and has stored the connection context information of the terminal device is referred to as the first state. However, this application is not limited thereto. The first state may be a sub-state of the connected state or an enhanced state of the idle state. The first state may also be referred to as a light connected state, an inactive state, a low active state, a paging state, a low-overhead state, a new connected state, or a new idle state. However, this is not limited in this embodiment of this application. For example, the first state may include a new idle state in which the terminal device has stored the connection context information of the terminal device, or the first state may include a new connected state in which the terminal device is allowed to perform cell reselection based mobility.

Optionally, in this embodiment of this application, the terminal device in the first state is allowed to have cell reselection based mobility, and an interface between the terminal device and a core network device remains at an access network device that instructs the terminal device to enter the first state.

Optionally, in this embodiment of this application, the connection context information includes a connection configuration parameter for the terminal device and the access network device.

Optionally, the connection configuration parameter may specifically include a radio bearer configuration of the terminal device and/or identifier information of the terminal device. The radio bearer configuration may include a signaling radio bearer configuration and/or a data radio bearer configuration. The identifier information of the terminal device may include a source identifier of the terminal device.

Optionally, the connection context information is not limited to the connection configuration parameter, but may further include other information, for example, key information. The key information is used when encrypted transmission is performed or when terminal device authentication information is generated.

In S202, the terminal device sends a first message to the first access network device, where the first message is used to notify the first access network device that the paging area of the terminal device is changed, and the first access network device is a serving access network device of the terminal device.

In this embodiment of this application, when determining that the paging area of the terminal device is changed, the terminal device sends the first message to the first access network device. In other words, when determining that the terminal device has left a configured paging area, the terminal device may send the first message to notify the first access network device.

Optionally, because the paging area of the terminal device is changed and the terminal device has stored the connection context information, the terminal device may send an RRC connection resume request message. The RRC connection resume request message is used to request to resume an RRC connection, and the RRC connection resume request message may be used to notify the first access network device that the paging area of the terminal device is changed.

In an implementation, the RRC connection resume request message may include information that is used to notify the first access network device that the paging area of the terminal device is changed. In this case, a field used to indicate information that the paging area of the terminal device is changed may be added to the RRC connection resume request message.

For example, one bit is added to the RRC connection resume request message. When the bit is set to "1", the RRC connection resume request message may be used to notify the first access network device that the paging area of the terminal device is changed. When the bit is set to "0", the RRC connection resume request message may indicate that the paging area of the terminal device is not changed.

It should be understood that in this embodiment of this application, the description is provided merely using the example in which one bit is added to the RRC connection resume request message. However, this embodiment of this application is not limited thereto. Two or more bits may be added to the RRC connection resume request message as the field indicating the information that the paging area of the terminal device is changed.

In another implementation, a cause value in the RRC connection resume request message may indicate that the paging area of the terminal device is changed. In this case, without a change in a message structure or a message length of the RRC connection resume request message, the terminal device may notify, using the RRC connection resume request message, the first access network device that the paging area of the terminal device is changed.

Therefore, in this embodiment of this application, the first message is an RRC connection resume request message, so that an existing message format can be effectively used, and without a change in an existing protocol, the first access network device can be notified that the paging area of the terminal device is changed.

Optionally, in this embodiment of this application, the terminal device may send the first message to the first access network device using a first signaling channel of a common channel.

In S203, the first access network device receives the first message sent by the terminal device.

In S204, the first access network device obtains the connection context information of the terminal device from a second access network device, where the second access network device is an access network device corresponding to a cell included in a paging area configured for the terminal device or is a predetermined access network device that is configured to store the connection context information of the terminal device.

Optionally, in this embodiment of this application, the second access network device may be the access network device corresponding to the cell included in the configured paging area that the terminal device has left. When the terminal device is located in a cell of the second access network device, the second access network device may send, to the terminal device, information that instructs to enter the first state, and the terminal device may enter the first state according to the instruction information. When the paging area of the terminal device is changed, the serving access network device of the terminal device may obtain the connection context information of the terminal device from the second access network device.

Optionally, in this embodiment of this application, the second access network device may alternatively be the predetermined access network device that is configured to store the connection context information of the terminal device.

Specifically, the second access network device may store connection context information of a plurality of terminal devices. When the plurality of terminal devices move within a specific area (for example, an area of at least one paging area), serving access network devices of the terminal devices may obtain the connection context information of the terminal devices from the second access network device, and then set up connections to the terminal devices. In this case, the second access network device may be referred to as an anchor access network device.

Optionally, in this embodiment of this application, the first message may further include identifier information of the second access network device, and the first access network device may determine the second access network device based on the identifier information of the second access network device.

Optionally, in this embodiment of this application, the first access network device may send a first instruction message to the second access network device. The first instruction message carries the identifier information of the terminal device to request the connection context information of the terminal device from the second access network device. The second access network device may determine the connection context information of the terminal device based on the identifier information of the terminal device.

Then, the first access network device receives a context transfer message sent by the second access network device. The context transfer message includes the connection context information of the terminal device.

It should be understood that alternatively, the first access network device may first determine a to-be-entered state of the terminal device, and then obtain the connection context information of the terminal device from the second access network device. In other words, S205 is performed before S204.

In addition, it should be understood that because the connection context information is used to set up a connection between the first access network device and the terminal device, alternatively, the first access network device may obtain the connection context information of the terminal device from the second access network device only when determining that the terminal device needs to be in a second state.

Therefore, in this embodiment of this application, the first access network device obtains the connection context information of the terminal device from the second access network device, so that the first access network device can rapidly resume a connection to the terminal device based on the connection context of the terminal device when determining that the terminal device needs to be in the second state.

In S205, the first access network device determines a to-be-entered state of the terminal device.

In an implementation, when determining that the current terminal device has a service request, the first access network device may determine that the to-be-entered state is the second state; in other words, the terminal device needs to enter a connected state to transmit data.

For example, when receiving a paging message for paging the terminal device, the first access network device may determine that the terminal device needs to enter the second state to transmit data.

In another implementation, when determining that the terminal device currently has no data transmission requirement, the first access network device may determine that the terminal device needs to continue to be in the first state.

For example, when receiving no paging message for paging the terminal device, the first access network device may determine that the terminal device can remain in the first state.

In another implementation, when the first access network device determines that the terminal device has no data transmission requirement for a relatively long period of time, the first access network device may determine that the terminal device needs to enter an idle state.

In S206, the first access network device sends a second message to the terminal device. When determining that the to-be-entered state of the terminal device is the second state, the first access network device may send, to the terminal device, a second message that is used to instruct the terminal device to enter the second state.

Optionally, when determining that the terminal device needs to remain in the first state, the first access network device may send, to the terminal device, a second message that is used to instruct the terminal device to remain in the first state.

Optionally, the first access network device may indicate, based on content carried in the second message and/or a type of the second message, the to-be-entered state of the terminal device.

Optionally, in this embodiment of this application, after receiving the first message sent by the terminal device using the first signaling channel of the common channel, the first access network device may send the second message to the terminal device using a second signaling channel of a dedicated channel.

Optionally, the first access network device may activate the second signaling channel based on the connection context information of the terminal device, and sends the second message to the terminal device using the second signaling channel.

In S207, the terminal device receives the second message sent by the first access network device.

Optionally, in this embodiment of this application, after sending the first message to the first access network device using the first signaling channel of the common channel, the terminal device may receive the second message using the second signaling channel.

Optionally, the terminal device may activate the second signaling channel based on a signaling channel parameter saved in the connection context information of the terminal device, and receives the second message using the second signaling channel.

In S208, the terminal device determines, based on the second message, the to-be-entered state of the terminal device.

Optionally, the terminal device may determine, based on the content carried in the second message and/or the type of the second message, the to-be-entered state of the terminal device.

In S209, when the terminal device determines that the to-be-entered state is a second state, the terminal device enters the second state based on the stored connection context information, where the second state includes that the terminal device and the first access network device are connected.

In this embodiment of this application, when determining that the terminal device needs to enter the second state, the terminal device may enter a connected state based on the connection context, and after entering the connected state, the terminal device may perform data transmission with the first access network device.

Optionally, in this embodiment of this application, after entering the second state, the terminal device may send a third message to the first access network device, to indicate that the terminal device has received the second message and entered the second state.

Optionally, in this embodiment of this application, when the terminal device determines that the to-be-entered state is the first state, the terminal device remains in the first state. Optionally, when the terminal device needs to be in the first state, the terminal device may send a fourth message to the first access network device, to indicate that the terminal device has received the second message. The terminal device may enter the second state based on the stored connection context information, and send the fourth message to the first access network device; and enter the first state after sending the fourth message.

Optionally, when the terminal device needs to be in the first state, the terminal device may send a fourth message to the first access network device when remaining in the first state, to indicate that the terminal device has received the second message.

Optionally, when the terminal device needs to be in the first state, the terminal device may remain in the first state, and may not reply to the first access network device with a message.

Optionally, in this embodiment of this application, the third message and the fourth message may be messages of a same type. For example, when the second message is an RRC connection resume message, the third message and the fourth message may both be an RRC connection resume complete message.

Therefore, in this embodiment of this application, after leaving a configured paging area, the terminal device in the first state sends, to the first access network device, the first message that is used to notify the first access network device that the paging area of the terminal device is changed; and the terminal device determines, based on the second message sent by the first access network device, the to-be-entered state of the terminal device. When the terminal device needs to enter a connected state, the terminal device can directly enter the connected state based on the stored connection context information, without setting up another connection to an access network device. In this way, the terminal device can rapidly enter the connected state. In addition, the terminal device does not need to notify a core network device that the paging area of the terminal device is changed. This can reduce signaling between the access network device and the core network device, thereby reducing signaling overheads.

In addition, the first access network device obtains the connection context information from the second access network device, so that the first access network device can rapidly set up a connection to the terminal device based on the connection context when determining that the terminal device needs to enter the second state.

Optionally, in this embodiment of this application, the first access network device may indicate, based on the content carried in the second message and/or the type of the second message, the to-be-entered state of the terminal device. Correspondingly, the terminal device may determine, based on the content carried in the second message and/or the type of the second message, the to-be-entered state of the terminal device.

Optionally, in this embodiment of this application, the content carried in the second message may include state indication information and/or paging area configuration information.

Optionally, the state indication information is used to indicate the to-be-entered state of the terminal device, and the second message may carry the state indication information using one dedicated field.

For example, the second message includes one bit used to carry the state indication information. When the bit is "1", the second message is used to indicate that the terminal device needs to be in the second state. When the bit is "0", the second message is used to indicate that the terminal device needs to be in the first state.

Optionally, the paging area configuration information is used to update a paging area configuration for the terminal device.

The following provides description with reference to how the first access network device obtains the paging area configuration information, to update the paging area configuration for the terminal device.

In an implementation, the first access network device sends a candidate cell to the second access network device; the first access network device receives information about a selected cell that is sent by the second access network device; and the first access network device generates the paging area configuration information based on the information about the selected cell.

Optionally, in this embodiment of this application, the first access network device may separately send the candidate cell, or may send the candidate cell to the second access network device by using a first instruction message.

Specifically, the first access network device sends, to the second access network device, the first instruction message that carries the candidate cell. The first instruction message carries the identifier information of the terminal device to instruct the second access network device to determine the selected cell from the candidate cell.

Optionally, in this embodiment of this application, the first access network device may receive the information about the selected cell using a context transfer message.

Optionally, the second access network device may determine the selected cell from the candidate cell based on a moving speed of the terminal device.

For example, the first access network device sends a cell 1, a cell 2, a cell 3, and a cell 4 to the second access network device as candidate cells. The second access network device may select a cell based on a moving speed of the terminal device. When the terminal device moves relatively fast, the second access network device may select all of the candidate cells as selected cells. This can avoid the necessity of configuring a new paging area because the terminal device leaves a current paging area too fast.

For another example, the first access network device sends a cell 1, a cell 2, a cell 3, and a cell 4 to the second access network device as candidate cells. When the terminal device moves relatively slowly, the second access network device may select the cell 1 and the cell 2 from the candidate cells as selected cells. This can reduce paging signaling in a paging process.

In another implementation, in this embodiment of this application, the first access network device sends a first instruction message to the second access network device, where the first instruction message carries the identifier information of the terminal device to instruct the second access network device to send a paging area configuration requirement parameter of the terminal device to the first access network device; the first access network device receives the paging area configuration requirement parameter of the terminal device that is sent by the second access network device; and based on the paging area configuration requirement parameter of the terminal device, the first access network device determines a cell included in a paging area that is to be configured for the terminal device, and generates the paging area configuration information.

Optionally, in this embodiment of this application, the first access network device may receive the paging area configuration requirement parameter using a context transfer message. Optionally, in this embodiment of this application, the context transfer message may be a handover message sent by the second access network device to the first access network device.

Optionally, the second access network device may determine the paging area configuration requirement parameter based on a moving speed of the terminal device.

In an implementation, when the terminal device moves relatively fast, the second access network device may determine the paging area requirement parameter, to instruct the first access network device to configure a relatively large paging area (for example, the paging area includes a relatively large quantity of cells) for the terminal device, and the first access network device determines the paging area configuration information based on the paging area requirement parameter.

For example, the paging area configuration requirement parameter may indicate a quantity of cells that can be included in a current paging area. When the terminal device moves relatively fast, the paging area configuration requirement parameter may indicate that the current paging area can include four cells, and the first access network device determines four cells as a paging area according to this quantity of cells.

In another implementation, when the terminal device moves relatively slowly, the second access network device may determine the paging area requirement parameter, to instruct the first access network device to configure a relatively small paging area (for example, the paging area includes a relatively small quantity of cells) for the terminal device, and the first access network device determines the paging area configuration information based on the paging area requirement parameter.

For example, when the terminal device moves relatively slowly, the paging area configuration requirement parameter may indicate that a current paging area can include two cells, and the first access network device determines two cells as a paging area according to this quantity of cells.

Optionally, after the first access network device generates the paging area configuration information based on the paging area configuration requirement parameter, the first access network device may send the paging area configuration information to the second access network device, so that after receiving paging information for paging the terminal device, the second access network device can page the terminal device in a cell included in a paging area determined based on the paging area configuration information.

Optionally, in this embodiment of this application, when a type of the first message is an RRC connection resume request message, the type of the second message may be an RRC connection resume message or an RRC connection reject message. The RRC connection resume message is used to instruct the terminal device to resume the RRC connection, and the RRC connection reject message is used to indicate that the first access network device rejects resuming of the RRC connection.

For ease of understanding this application, the following uses a method A, a method B, and a method C as examples to describe how the first access network device indicates the to-be-entered state of the terminal device using a type and/or content of the second message.

Method A

The first access network device may indicate, using the content carried in the second message, the to-be-entered state of the terminal device. Correspondingly, the terminal device may determine, based on the content carried in the second message, the to-be-entered state of the terminal device.

In an implementation, the content carried in the second message includes the state indication information. When the state indication information is "entering the second state", the second message may instruct the terminal device to enter the second state. In this case, the terminal device enters a connected state based on the connection context. Alternatively, when the state indication information is "remaining in the first state", the second message may instruct the terminal device to remain in the first state. Alternatively, when the state indication information includes no information, the second message may instruct the terminal device to enter the second state.

In another implementation, the content carried in the second message includes the paging area configuration information. When a paging area configured in the paging area configuration information includes at least one cell, the second message may instruct the terminal device to remain in the first state. When a paging area configured in the paging area configuration information includes no cell, the second message may instruct the terminal device to enter the second state.

In another implementation, the content carried in the second message includes the state indication information and the paging area configuration information. When the state indication information is "remaining in the first state" and a paging area configured in the paging area configuration information includes at least one cell, the second message may instruct the terminal device to remain in the first state. When the state indication information is "entering the second state" and a paging area configured in the paging area configuration information includes no cell, the second message may instruct the terminal device to enter the second state.

Method B

The first access network device may indicate, using the type of the second message, the to-be-entered state of the terminal device. Correspondingly, the terminal device determines, based on the type of the second message, the to-be-entered state of the terminal device.

In an implementation, when the type of the second message is an RRC connection reject message, the terminal device determines that the to-be-entered state is the first state.

In another implementation, when the type of the second message is an RRC connection resume message, the terminal device determines that the to-be-entered state is the second state.

For example, when the type of the second message is an RRC connection reject message, the terminal device may determine that the to-be-entered state of the terminal device in the first state; and when the type of the second message is an RRC connection resume message, the terminal device may determine that the to-be-entered state of the terminal device is the second state.

Method C

The first access network device may indicate, using the content carried in the second message and the type of the second message, the to-be-entered state of the terminal device. Correspondingly, the terminal device determines, based on the type and the content of the second message, the to-be-entered state of the terminal device.

In an implementation, when the type of the second message is an RRC connection resume message and the content carried in the second message is used to instruct the terminal device to be in the first state, the terminal device determines that the to-be-entered state is the first state.

For example, when the terminal device receives an RRC connection resume message, and state indication information included in the RRC connection resume message is "remaining in the first state" and/or a paging area configured in the paging area configuration information included in the RRC connection resume message includes at least one cell, the terminal device remains in the first state.

In another implementation, when the type of the second message is an RRC connection resume message and the content carried in the second message is used to instruct the terminal device to be in the second state, the terminal device determines that the to-be-entered state of the terminal device is the second state.

For example, when the terminal device receives an RRC connection resume message, and state indication information included in the RRC connection resume message is "entering the second state" and/or a paging area configured in the paging area configuration information included in the RRC connection resume message includes no cell, the terminal device enters the second state.

Therefore, in this embodiment of this application, when the second message is an RRC connection resume message or an RRC connection reject message, an existing message can also be fully used to indicate the to-be-entered state of the terminal device. In addition, when the terminal device needs to enter the second state, the terminal device can rapidly enter the connected state by accepting the RRC connection resume message.

It should be understood that only an RRC connection is used as an example for description in this embodiment of this application. However, this embodiment of this application should not be limited thereto. Alternatively, other connections between the terminal device and an access network device may be used.

In addition, it should be understood that using the form of method A, method B, and method C is intended to describe this embodiment of this application more clearly. However, the method A, method B, and method C are not independent of each other, and features belonging to different methods may be combined with each other.

Optionally, in this embodiment of this application, the RRC connection resume message includes a field of encryption parameter. The terminal device can perform different processing on the encryption parameter based on different to-be-entered states of the terminal device.

In an implementation, when the terminal device determines, based on the RRC connection resume message, that the to-be-entered state is the first state, the terminal device may ignore the encryption parameter used to resume the RRC connection in the RRC connection resume message.

If the terminal device enters the second state based on the encryption parameter, there may be no data transmission for a long time. In this case, useless electric energy consumption may be caused for the terminal device. Therefore, when determining that the to-be-entered state is the first state, the terminal device may ignore the encryption parameter and remain in the first state. In this way, it can be avoided that the terminal device enters the connected state based on the encryption parameter even when determining to remain in the first state.

In another implementation, when the terminal device determines, based on the RRC connection resume message, that the to-be-entered state is the second state, the terminal device needs to resume the RRC connection based on the encryption parameter in the RRC connection resume message.

Optionally, in this embodiment of this application, the RRC connection reject message may include a field that carries wait time information. The wait time information is used to indicate a wait time required for resuming the RRC connection between the terminal device and the first access network device.

Optionally, the terminal device may perform different processing based on the wait time information and different to-be-entered states of the terminal device.

In an implementation, when the terminal device determines, based on the RRC connection reject message, that the to-be-entered state is the first state, the terminal device ignores the wait time information included in the RRC connection reject information.

If the terminal device does not ignore the wait time information included in the RRC connection reject information, the terminal device may actively resume the RRC connection to the first access network device after the wait time expires. In this case, because there is no data needing to be transmitted, useless electric energy consumption may be caused for the terminal device.

In an implementation, a cause value in the RRC connection reject message may indicate that a paging area is successfully configured for the terminal device, and the terminal device determines that the to-be-entered state is the first state. In this case, the terminal device may ignore the wait time information included in the RRC connection reject information.

When the foregoing described RRC connection reject message responds to an RRC connection resume request message that carries a paging area change notification, the terminal device may ignore the wait time information included in the RRC connection reject message.

In this embodiment of this application, alternatively, the RRC connection reject message may respond to an RRC connection resume request message that does not carry the paging area change notification. In this case, the terminal device starts a timer based on the wait time information included in the RRC connection reject message, to remain in the first state within the timer.

In an implementation, when the RRC connection resume request message does not include information that is used to notify the first access network device that the paging area of the terminal device is changed, the terminal device starts a timer based on the wait time information included in the RRC connection reject information.

In another implementation, when a cause value in the RRC connection resume request message does not indicate that the paging area of the terminal device is changed, the terminal device starts a timer based on the wait time information included in the RRC connection reject information.

It should be understood that in this embodiment of this application, the paging area configuration information is determined by the second access network device or determined based on the paging area configuration requirement parameter sent by the second access network device. However, this embodiment of this application is not limited thereto. Alternatively, the paging area configuration information may be determined by the first access network device. In this case, the first access network device includes all information related to the terminal device that is stored in the second access network device, and the first access network device can replace the second access network device. To be specific, when a core network device pages the terminal device, the first access network device may page the terminal device in the cell included in the paging area determined based on the paging area configuration information.

In addition, it should be understood that in this embodiment of this application, the description is provided merely using the example in which the second access network device determines the selected cell or the paging area configuration requirement parameter based on the moving speed of the terminal device. However, this embodiment of this application is not limited thereto. Alternatively, the second access network device may determine the selected cell or the paging area configuration requirement parameter based on another factor.

Figure 3:
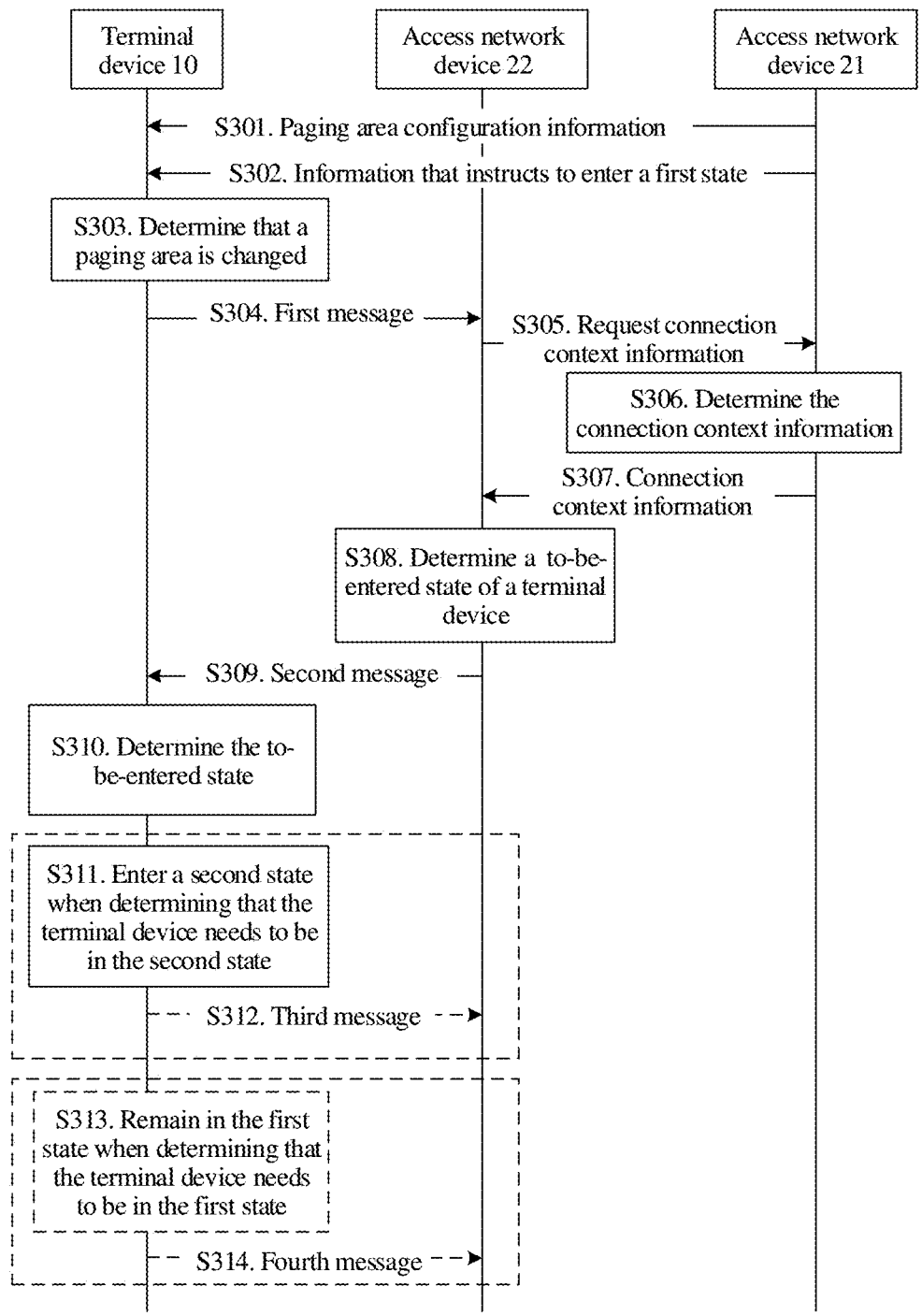
FIG. 3 is a schematic flowchart of a communication method according to an embodiment of this application.

For ease of understanding this application more clearly, the following uses the scenario shown in FIG. 1 as an example to describe in detail the communication method in the embodiments of this application with reference to a method 300 shown in FIG. 3.

FIG. 3 is a schematic flowchart of a communication method 300 according to an embodiment of this application.

In S301, an access network device 21 sends paging area configuration information to a terminal device 10. The paging area configuration information is used to indicate a cell included in a paging area in which the terminal device is currently located, for example, including a cell of an access network device 20 and a cell of the access network device 21.

In S302, when determining that the terminal device 10 needs to remain in a first state (for example, no data currently needs to be transmitted to the terminal device), the access network device 21 may send, to the terminal device 10, information that instructs to enter the first state. In this case, the terminal device 10 may be located within the cell of the access network device 21.

It should be understood that execution of S301 and S302 is not limited to a particular sequence. For example, the access network device 21 may send the paging area configuration information to the terminal device 10 before instructing the terminal device 10 to enter the first state. Alternatively, the access network device 21 may instruct the terminal device 10 to enter the first state before sending the paging area configuration information to the terminal device 10. Alternatively, the access network device 21 may send the paging area configuration information to the terminal device 10 simultaneously when instructing the terminal device 10 to enter the first state.

In S303, the terminal device 10 leaves a paging area 1 and enters a coverage area of a cell of an access network device 22. The terminal device 10 may determine, based on the paging area configuration information sent in S301, that the terminal device 10 has left the configured paging area.

In S304, the terminal device 10 sends a first message to the access network device 22. The first message is used to indicate that a paging area of the terminal device 10 is changed.

In S305, the access network device 22 may send, to the access network device 21, a request message that is used to request connection context information of the terminal device.

It should be understood that the method 300 is described using an example in which the connection context information of the terminal device is stored in an access network device corresponding to a cell included in the configured paging area that the terminal device has left. Alternatively, a connection context of the terminal device may be stored in a predetermined access network device that is configured to store the connection context information of the terminal device.

In S306, the access network device 21 may determine the connection context information of the terminal device 10.

In S307, the access network device 21 may send the connection context information of the terminal device to the access network device 22.

In this embodiment of this application, the access network device 22 obtains the connection context information of the terminal device 10 from the access network device 21, so that the access network device 22 can rapidly resume a connection to the terminal device 10 based on the connection context information of the terminal device 10 when determining that the terminal device 10 needs to be in a second state.

In S308, after receiving the first message from the terminal device 10, the access network device 22 determines a to-be-entered state of the terminal device 10.

In an implementation, when determining that the current terminal device 10 has a service request, the access network device 22 may determine that the terminal device 10 needs to be in the second state; in other words, the terminal device 10 needs to enter a connected state to transmit data.

In another implementation, when determining that the terminal device 10 currently has no data transmission requirement, the access network device 22 may determine that the terminal device 10 needs to continue to be in the first state.

In S309, the access network device 22 sends a second message to the terminal device 10, where the second message is used to indicate the to-be-entered state of the terminal device 10.

Optionally, when determining that the terminal device 10 needs to be in the second state, the access network device 22 may send, to the terminal device 10 based on the connection context information of the terminal device 10, a second message that is used to instruct the terminal device 10 to enter the second state.

Optionally, when determining that the terminal device 10 needs to remain in the first state, the access network device 22 may send, to the terminal device 10, a second message that is used to instruct the terminal device 10 to remain in the first state.

Optionally, when the terminal device 10 needs to remain in the first state, the access network device 22 may carry paging area configuration information, for example, configuration information of a paging area 2, to the second message, to configure a new paging area for the terminal device 10.

In S310, the terminal device 10 determines, based on the second message, the to-be-entered state of the terminal device 10.

Optionally, in S311, when the terminal device 10 determines, based on the second message, that the terminal device 10 needs to enter the second state, the terminal device 10 enters the second state based on the connection context information. In addition, in 312, the terminal device 10 may send a third message to the access network device 22, where the third message is used to notify the access network device 22 that the terminal device 10 has entered the second state.

Optionally, in S313, when the terminal device 10 determines, based on the second message, that the terminal device 10 needs to be in the first state, the terminal device 10 remains in the first state. In addition, in 314, the terminal device 10 may send a fourth message to the access network device 22, where the fourth message is used to notify the access network device 22 that the terminal device 10 has received the second message.

Specifically, the terminal device 10 may enter the second state based on the connection context information, and send the fourth message to the access network device 22; and enter the first state after sending the fourth message.

Certainly, when determining to remain in the first state, the terminal device may not reply to the second message, but remain in the first state.

It should be understood that for implementations of the steps in the method 300 according to this embodiment of this application in FIG. 3, refer to the detailed descriptions in the method 200 according to the embodiment of this application in FIG. 2. For brevity, details are not described herein again.

In addition, it should be understood that in this embodiment of this application, sequence numbers of the foregoing processes do not mean an execution sequence. The execution sequence of the processes should be determined based on functions and internal logic of the processes, and shall not be construed as any limitation to an implementation process of this embodiment of this application.

FIG. 4 is a schematic flowchart of a communication method 400 according to an embodiment of this application.

In S401, a first access network device receives a first message sent by a terminal device, where the first message is used to notify the first access network device that a paging area of the terminal device is changed.

For example, as shown in FIG. 1, after a terminal device 10 moves from a cell of an access network device 21 in a paging area 1 to a cell of an access network device 22, the access network device 22 may receive a first message that is sent by the terminal device 10 to notify that a paging area of the terminal device 10 is changed.

In S402, the first access network device determines paging area configuration information, where the paging area configuration information is used to update a paging area configuration for the terminal device.

Specifically, the first access network device sends an instruction message to a second access network device, where the instruction message carries identifier information of the terminal device to instruct the second access network device to send information used to determine the paging area configuration information to the first access network device; the first access network device receives the information that is used to determine the paging area configuration information and sent by the second access network device; and the first access network device determines the paging area configuration information based on the information used to determine the paging area configuration information.

In an implementation, the first access network device sends, to the second access network device, the instruction message that carries information about a candidate cell, to instruct the second access network device to determine a selected cell from the candidate cell, where the selected cell is used to determine the paging area configuration information; the first access network device receives information about the selected cell that is sent by the second access network device; and the first access network device determines the selected cell as a cell included in a paging area that is to be configured for the terminal device, and generates the paging area configuration information.

For example, as shown in FIG. 1, assuming that an access network device in the paging area 1 that has performed paging area configuration for the terminal device 10 is the access network device 21, the access network device 22 sends, to the access network device 21, an instruction message that carries information about a candidate cell, to instruct the access network device 21 to determine a selected cell from the candidate cell; the access network device 22 receives information about the selected cell that is sent by the access network device 21; and the access network device 22 generates the paging area configuration information based on the selected cell.

Optionally, in this embodiment of this application, the first access network device may separately send the candidate cell; in other words, may not send the candidate cell using the instruction information.

In another implementation, in this embodiment of this application, the first access network device sends the instruction information to the second access network device, to instruct the second access network device to determine to send a paging area configuration requirement parameter of the terminal device to the first access network device, where the paging area configuration requirement parameter is used to determine the paging area configuration information; the first access network device receives the paging area configuration requirement parameter of the terminal device that is sent by the second access network device; and based on the paging area configuration requirement parameter of the terminal device, the first access network device determines a cell included in a paging area that is to be configured for the terminal device, and generates the paging area configuration information.

For example, as shown in FIG. 1, assuming that an access network device in the paging area 1 that has performed paging area configuration for the terminal device 10 is the access network device 21, the access network device 22 sends an instruction message to the access network device 21, where the instruction information carries identifier information of the terminal device 10, to instruct the access network device 21 to determine to send a paging area configuration requirement parameter of the terminal device 10 to the access network device 22; the access network device 22 receives the paging area configuration requirement parameter sent by the access network device 21; and based on the paging area configuration requirement parameter, the access network device 21 determines a cell included in a paging area 2 that is to be configured for the terminal device 10, and generates the paging area configuration information.

Optionally, after the first access network device generates the paging area configuration information based on the paging area configuration requirement parameter, the first access network device may send the paging area configuration information to the second access network device, so that after receiving paging information for paging the terminal device, the second access network device can page the terminal device in a cell included in a paging area determined based on the paging area configuration information.

For example, as shown in FIG. 1, the access network device 22 sends the paging area configuration information to the access network device 21.

In S403, the first access network device sends, to the terminal device, a second message that includes the paging area configuration information, so that the terminal device can perform configuration based on the paging area configuration information in the second message, to determine a current paging area of the terminal device.

For example, as shown in FIG. 1, the access network device 22 sends, to the terminal device 10, a second message that includes the paging area configuration information, so that the terminal device 10 can perform configuration based on the paging area configuration information in the second message.

Therefore, in this embodiment of this application, the first access network device knows a cell included in a paging area in which the terminal device is located, so that after receiving paging information for paging the terminal device, the first access network device can page the terminal device in the cell included in the paging area determined based on the paging area configuration information, and a core network device does not need to know the paging area in which the terminal device is located.

Figure 5:
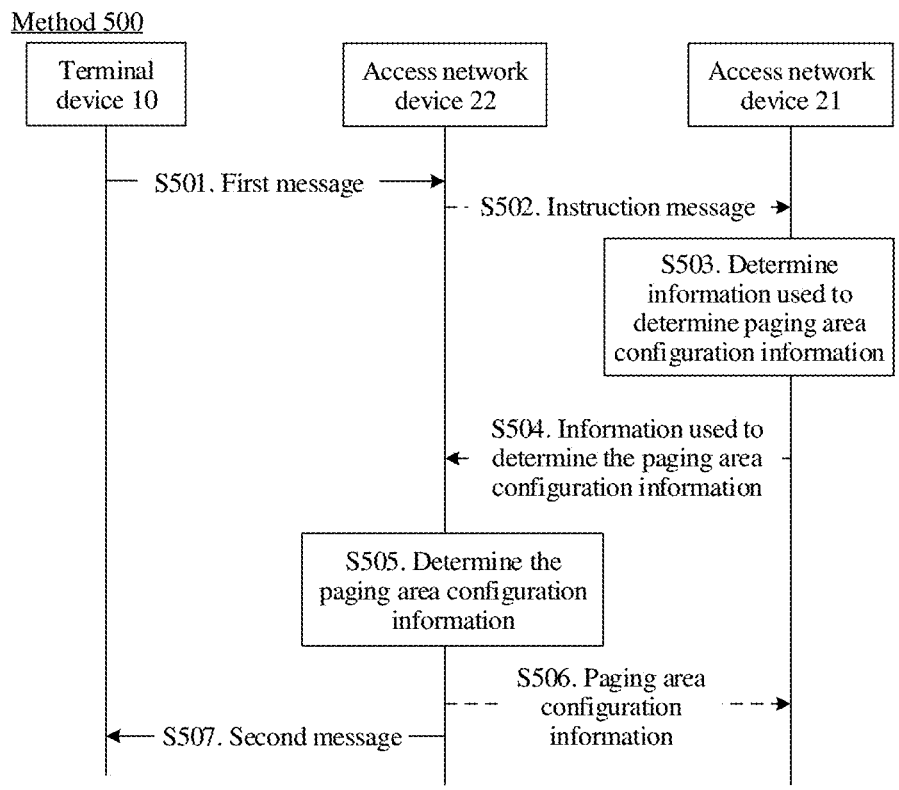
FIG. 5 is a schematic flowchart of a communication method according to an embodiment of this application.

FIG. 5 is a schematic flowchart of a communication method 500 according to an embodiment of this application.

In S501, a first access network device 22 receives a first message sent by a terminal device 10, where the first message is used to notify the first access network device 22 that a paging area of the terminal device 10 is changed.

Optionally, in S502, the first access network 22 device sends an instruction message to a second access network device 21, where the instruction message carries identifier information of the terminal device 10 to instruct the second access network device 21 to send information used to determine paging area configuration information to the first access network device 22.

In an implementation, the first access network device 22 sends, to the second access network device 21, the instruction information that carries information about a candidate cell, to instruct the second access network device 21 to determine a selected cell from the candidate cell, where the selected cell is used to determine the paging area configuration information.

In another implementation, the first access network device 22 sends the instruction message to the second access network device 21, to instruct the second access network device 21 to send a paging area configuration requirement parameter of the terminal device 10 to the first access network device 22, where the paging area configuration requirement parameter is used to determine the paging area configuration information.

Optionally, in S503, the second access network device 21 determines the information used to determine the paging area configuration information.

In an implementation, when the second access network device receives the instruction information that carries the information about the candidate cell, the second access network device determines the information used to determine the paging area configuration information.

In another implementation, when the second access network device receives the instruction information that is used to instruct the second access network device to send the paging area configuration requirement parameter of the terminal device to the first access network device, the second access network device sends information about a selected cell to the first access network device.

Optionally, in S504, the first access network device receives the information that is used to determine the paging area configuration information and sent by the second access network device.

In an implementation, when the instruction information is used to instruct the second access network device to determine the selected cell from the candidate cell, the second access network device sends the paging area configuration requirement parameter of the terminal device to the first access network device.

In another implementation, when the instruction message is used to instruct the second access network device to send the paging area configuration requirement parameter of the terminal device to the first access network device, the first access network device receives the paging area configuration requirement parameter sent by the second access network device.

In S505, the first access network device determines the paging area configuration information based on the information used to determine the paging area configuration information.

Optionally, when the first access network device receives the information about the selected cell, the first access network device determines the selected cell as a cell included in a paging area that is to be configured for the terminal device, and generates the paging area configuration information.

Optionally, when the first access network device receives the paging area configuration requirement parameter, based on the paging area configuration requirement parameter of the terminal device, the first access network device determines a cell included in a paging area that is to be configured for the terminal device, and generates the paging area configuration information.

Optionally, in S506, after the second access network device sends the paging area configuration requirement parameter of the terminal device to the first access network device, the second access network device receives the paging area configuration information that is generated based on the paging area configuration requirement parameter of the terminal device and sent by the first access network device. In this way, after subsequently receiving paging information for paging the terminal device, the second access network device can page the terminal device in a cell included in a paging area determined based on the paging area configuration information.

In S507, the first access network device sends, to the terminal device, a second message that carries the paging area configuration information.

Optionally, the terminal device performs configuration based on the paging area configuration information, to determine a cell included in a paging area in which the terminal device is currently located.

With reference to FIG. 1 to FIG. 5, the foregoing describes in detail the communication method according to the embodiments of this application. With reference to FIG. 6 to FIG. 10, the following describes in detail the terminal device and the access network device according to the embodiments of this application.

Figure 6:
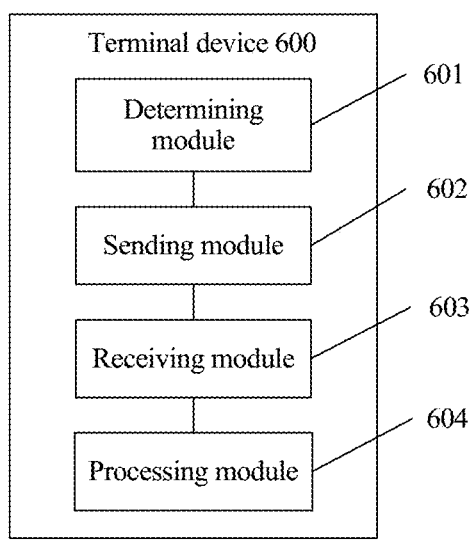
FIG. 6 is a schematic block diagram of a terminal device according to an embodiment of this application.

FIG. 6 is a schematic block diagram of a terminal device 600 according to an embodiment of this application. As shown in FIG. 6, the terminal device 600 includes a determining module 601, a sending module 602, a receiving module 603, and a processing module 604.

The determining module 601 is configured to determine that a paging area of the terminal device in a first state is changed, where the first state includes a state in which the terminal device monitors paging and has stored connection context information of the terminal device.

The sending module 602 is configured to send a first message to a first access network device, where the first message is used to notify the first access network device that the paging area of the terminal device is changed, and the first access network device is a serving access network device of the terminal device.

The receiving module 603 is configured to receive a second message sent by the first access network device based on the first message.

The determining module 601 is configured to determine, based on the second message received by the receiving module, a to-be-entered state of the terminal device.

The processing module 604 is configured to: when the determining module determines that the to-be-entered state is a second state, enter the second state based on the stored connection context information, where the second state includes that the terminal device and the first access network device are connected.

Therefore, in this embodiment of this application, after leaving a configured paging area, the terminal device in the first state sends, to the first access network device, the first message that is used to notify the first access network device that the paging area of the terminal device is changed; and the terminal device determines, based on the second message sent by the first access network device, the to-be-entered state of the terminal device. When the terminal device needs to enter a connected state, the terminal device can directly enter the connected state based on the stored connection context information, without setting up another connection to an access network device. In this way, the terminal device can rapidly enter the connected state. In addition, the terminal device does not need to notify a core network device that the paging area of the terminal device is changed. This can reduce signaling between the access network device and the core network device, thereby reducing signaling overheads.

In addition, the first access network device obtains the connection context information from a second access network device, so that the first access network device can rapidly set up a connection to the terminal device based on the connection context when determining that the terminal device needs to enter the second state.

Optionally, in this embodiment of this application, when the terminal device enters the second state based on the connection context information, the sending module 602 is further configured to send a third message to the first access network device, where the third message is used to notify the first access network device that the terminal device has entered the second state.

Optionally, in this embodiment of this application, the processing module 604 is further configured to remain in the first state when the determining module determines that the to-be-entered state is the first state.

Optionally, in this embodiment of this application, when the determining module 601 determines to remain in the first state, the sending module 602 is further configured to send a fourth message to the first access network device based on the stored context information, where the fourth message is used to indicate that the terminal device has received the second message.

Optionally, in this embodiment of this application, the determining module 601 is specifically configured to determine, based on a type of the second message and/or content carried in the second message, the to-be-entered state of the terminal device.

Optionally, in this embodiment of this application, the content carried in the second message may include state indication information and/or paging area configuration information.

Optionally, the state indication information is used to indicate the to-be-entered state of the terminal device.

Optionally, the paging area configuration information is used to update a paging area configuration for the terminal device.

Optionally, in this embodiment of this application, a type of the first message is an RRC connection resume request message. The RRC connection resume request message is used to request to resume an RRC connection to the first access network device, and the RRC connection resume request message may be used to notify the first access network device that the paging area of the terminal device is changed.

Optionally, a cause value in the RRC connection resume request message may indicate that the paging area of the terminal device is changed.

Optionally, in this embodiment of this application, when the type of the first message is an RRC connection resume request message, the type of the second message is an RRC connection resume message or an RRC connection reject message. The RRC connection resume message is used to instruct the terminal device to resume the RRC connection, and the RRC connection reject message is used to indicate that the first access network device rejects resuming of the RRC connection.

Optionally, in this embodiment of this application, the determining module 601 is further configured to: when the type of the second message is an RRC connection reject message, determine that the to-be-entered state is the first state; when the type of the second message is an RRC connection resume message, determine that the to-be-entered state is the second state; when the type of the second message is an RRC connection resume message and the content carried in the second message is used to instruct the terminal device to be in the first state, determine that the to-be-entered state is the first state; and when the type of the second message is an RRC connection resume message and the content carried in the second message is used to instruct the terminal device to be in the second state, determine that the to-be-entered state is the second state.

Optionally, in this embodiment of this application, when the type of the second message is an RRC connection resume message, the processing module 604 is further configured to: when the determining module 601 determines, based on the RRC connection resume message, that the to-be-entered state is the first state, ignore an encryption parameter used to resume the RRC connection in the RRC connection resume message.

Optionally, in this embodiment of this application, when the second message is an RRC connection reject message, the processing module 604 is further configured to: when the determining module 601 determines, based on the RRC connection reject message, that the to-be-entered state is the first state, ignore wait time information included in the RRC connection reject message, where the wait time information is used to indicate a wait time required for resuming the RRC connection between the terminal device and the first access network device.

Optionally, in this embodiment of this application, the receiving module 603 is further configured to receive instruction information sent by a second access network device, where the instruction information is used to instruct the terminal device to enter the first state, and the instruction information includes paging area configuration information used to configure a paging area for the terminal device.

It should be understood that the terminal device 600 according to this embodiment of this application may be corresponding to the terminal device in the embodiments of this application, and the foregoing and other operations and/or functions of the modules in the terminal device 600 are intended to implement corresponding procedures of the methods in FIG. 1 to FIG. 5. For brevity, details are not described herein again.

Figure 7:
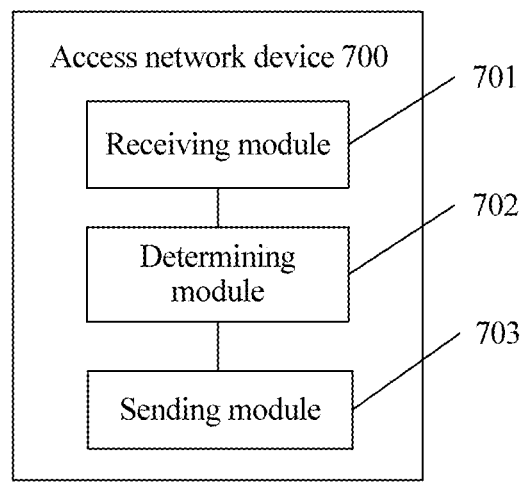
FIG. 7 is a schematic block diagram of an access network device according to an embodiment of this application.

FIG. 7 is a schematic block diagram of an access network device 700 according to an embodiment of this application. As shown in FIG. 7, the access network device 700 includes a receiving module 701, a determining module 702, and a sending module 703.

The receiving module 701 is configured to receive a first message sent by a terminal device in a first state, where the first message is used to notify the access network device that a paging area of the terminal device is changed, and the first state includes a state in which the terminal device monitors paging and has stored connection context information of the terminal device.

The receiving module 701 is further configured to obtain the connection context information of the terminal device from a second access network device, where the second access network device is an access network device corresponding to a cell included in a paging area configured for the terminal device or is a predetermined access network device that is configured to store the connection context information of the terminal device.

The determining module 702 is configured to determine a to-be-entered state of the terminal device.

The sending module 703 is configured to: when the determining module 702 determines that the to-be-entered state is a second state, send, to the terminal device based on the connection context information of the terminal device, a second message that is used to instruct the terminal device to enter the second state.

Optionally, in this embodiment of this application, after the sending module 703 sends, to the terminal device, the second message that is used to instruct the terminal device to enter the second state, the receiving module 701 is further configured to receive a third message sent by the terminal device, where the third message is used to notify the access network device that the terminal device has entered the second state.

Optionally, in this embodiment of this application, when the determining module 702 determines that the to-be-entered state of the terminal device is the first state, the sending module 703 is further configured to send, to the terminal device, a second message that is used to instruct the terminal device to remain in the first state.

Optionally, in this embodiment of this application, after the sending module 703 sends, to the terminal device, the second message that is used to instruct the terminal device to remain in the first state, the receiving module 701 is further configured to receive a fourth message sent by the terminal device based on the stored context information, where the fourth message is used to indicate that the terminal device has received the second message.

Optionally, in this embodiment of this application, content carried in the second message may include state indication information and/or paging area configuration information.

Optionally, the state indication information is used to indicate the to-be-entered state of the terminal device.

Optionally, the paging area configuration information is used to update a paging area configuration for the terminal device.

Optionally, in this embodiment of this application, a type of the first message is an RRC connection resume request message. The RRC connection resume request message is used to request to resume an RRC connection to the first access network device, and the RRC connection resume request message may be used to notify the first access network device that the paging area of the terminal device is changed.

Optionally, a cause value in the RRC connection resume request message may indicate that the paging area of the terminal device is changed.

Optionally, in this embodiment of this application, when the type of the first message is an RRC connection resume request message, the type of the second message is an RRC connection resume message or an RRC connection reject message. The RRC connection resume message is used to instruct the terminal device to resume the RRC connection, and the RRC connection reject message is used to indicate that the first access network device rejects resuming of the RRC connection.

Optionally, in this embodiment of this application, the second message whose message type is an RRC connection reject message is used to instruct the terminal device to remain in the first state; the second message whose message type is an RRC connection resume message and that carries content that instructs the terminal device to enter the first state is used to instruct the terminal device to remain in the first state; the second message whose message type is an RRC connection resume message is used to instruct the terminal device to enter the second state; and the second message whose message type is an RRC connection resume message and that carries content that is used to instruct the terminal device to enter the second state is used to instruct the terminal device to enter the second state.

Optionally, in this embodiment of this application, the sending module 703 is further configured to send information about a candidate cell to the second access network device.

The receiving module 701 is further configured to receive information about a selected cell that is sent by the second access network device.

The determining module 702 is further configured to generate the paging area configuration information based on the information about the selected cell.

Optionally, in this embodiment of this application, the sending module 703 is further configured to send a first instruction message to the second access network device, where the first instruction message carries identifier information of the terminal device to instruct the second access network device to send a paging area configuration requirement parameter of the terminal device to the access network device.

The receiving module 701 is further configured to receive the paging area configuration requirement parameter of the terminal device that is sent by the second access network device.

The determining module 702 is further configured to: based on the paging area configuration requirement parameter of the terminal device, determine a cell included in a paging area that is to be configured for the terminal device, and generate the paging area configuration information.

Optionally, in this embodiment of this application, after the determining module 702 generates the paging area configuration information based on the paging area configuration requirement parameter of the terminal device, the sending module 703 is further configured to send the paging area configuration information to the second access network device.

It should be understood that the access network device 700 according to this embodiment of this application may be corresponding to the first access network device in the embodiments of this application, and the foregoing and other operations and/or functions of the modules in the access network device 700 are intended to implement corresponding procedures of the methods in FIG. 2 and FIG. 3. For brevity, details are not described herein again.

Figure 8:
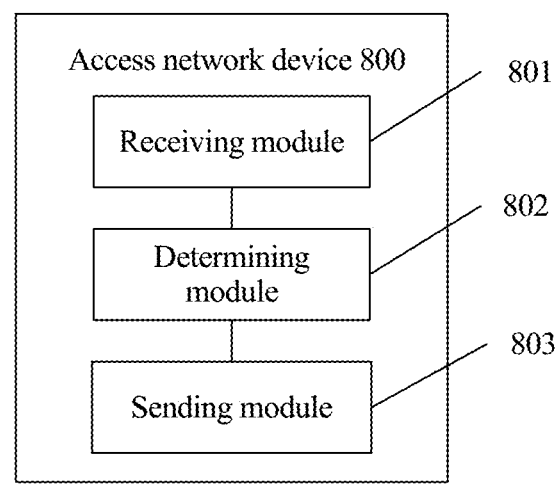
FIG. 8 is a schematic block diagram of an access network device according to an embodiment of this application.

FIG. 8 is a schematic block diagram of an access network device 800 according to an embodiment of this application. As shown in FIG. 8, the access network device 800 includes a receiving module 801, a determining module 802, and a sending module 803.

The receiving module 801 is configured to receive a first instruction message sent by a first access network device, where the first instruction message carries identifier information of a terminal device to request connection context information of the terminal device, the first instruction message is sent by the first access network device after receiving a first message, the first message is used to notify the first access network device that a paging area of the terminal device in a first state is changed, the first access network device is a serving access network device of the terminal device, and the first state includes a state in which the terminal device monitors paging and has stored the connection context information of the terminal device.

The determining module 802 is configured to determine the connection context information of the terminal device based on the identifier information of the terminal device.

The sending module 803 is configured to send a context transfer message to the first access network device, where the context transfer message includes the connection context information of the terminal device.

Optionally, in this embodiment of this application, before the receiving module 801 receives the first instruction message sent by the first access network device, the sending module 803 is further configured to: when the terminal device is located in a cell of the access network device, send, to the terminal device, information that instructs to enter the first state.

Optionally, in this embodiment of this application, the receiving module 801 is further configured to receive information about a candidate cell that is sent by the first access network device.

The determining module 802 is further configured to determine a selected cell based on the candidate cell.

The sending module 803 is further configured to send information about the selected cell to the first access network device.

Optionally, in this embodiment of this application, the receiving module 801 is further configured to receive first instruction information sent by the first access network device, where the first instruction message carries the identifier information of the terminal device to instruct the access network device to send a paging area configuration requirement parameter of the terminal device to the first access network device.

The determining module 802 is further configured to determine the paging area configuration requirement parameter of the terminal device.

The sending module 803 is further configured to send the paging area configuration requirement parameter of the terminal device to the first access network device.

Optionally, in this embodiment of this application, the receiving module 801 is further configured to receive paging area configuration information that is generated based on the paging area configuration requirement parameter of the terminal device and sent by the first access network device.

It should be understood that the access network device 800 according to this embodiment of this application may be corresponding to the second access network device in the embodiments of this application, and the foregoing and other operations and/or functions of the modules in the access network device 800 are intended to implement corresponding procedures of the methods in FIG. 2 and FIG. 3. For brevity, details are not described herein again.

Figure 9:
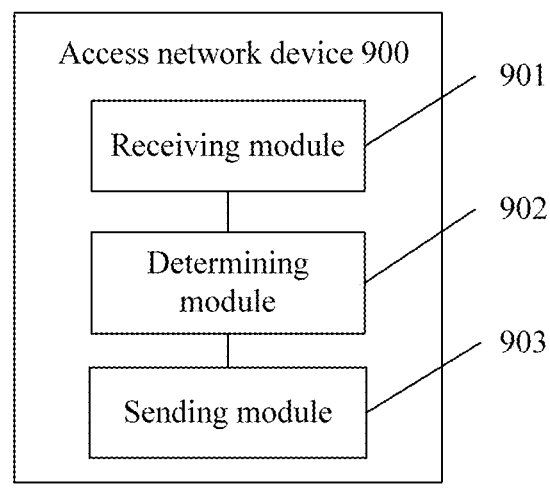
FIG. 9 is a schematic block diagram of an access network device according to an embodiment of this application.

FIG. 9 is a schematic block diagram of an access network device 900 according to an embodiment of this application. As shown in FIG. 9, the access network device 900 includes a receiving module 901, a determining module 902, and a sending module 903.

The receiving module 901 is configured to receive a first message sent by a terminal device, where the first message is used to notify the access network device that a paging area of the terminal device is changed.

The determining module 902 is configured to determine paging area configuration information, where the paging area configuration information is used to update a paging area configuration for the terminal device.

The sending module 903 is configured to send, to the terminal device, a second message that includes the paging area configuration information.

Therefore, the first access network device knows a cell included in a paging area in which the terminal device is located, so that after receiving paging information for paging the terminal device, the access network device can page the terminal device in the cell included in the paging area determined based on the paging area configuration information, and a core network device does not need to know the paging area in which the terminal device is located.

Optionally, in this embodiment of this application, the sending module 903 is further configured to send an instruction message to the second access network device, where the instruction message carries identifier information of the terminal device to instruct the second access network device to send information used to determine the paging area configuration information to the access network device.

The receiving module 901 is further configured to receive the information that is used to determine the paging area configuration information and sent by the second access network device.

The determining module 902 is further configured to determine the paging area configuration information based on the information used to determine the paging area configuration information.

In an implementation, the sending module 903 is further configured to send, to the second access network device, the instruction message that carries information about a candidate cell, to instruct the second access network device to determine a selected cell from the candidate cell, where the selected cell is used to determine the paging area configuration information.

The receiving module 901 is further configured to receive information about the selected cell that is sent by the second access network device.

The determining module 902 is further configured to determine the selected cell as a cell included in a paging area that is to be configured for the terminal device, and generate the paging area configuration information.

In another implementation, the sending module 903 is further configured to send the instruction information to the second access network device, to instruct the second access network device to determine to send a paging area configuration requirement parameter of the terminal device to the access network device, where the paging area configuration requirement parameter is used to determine the paging area configuration information.

The receiving module 901 is further configured to receive the paging area configuration requirement parameter of the terminal device that is sent by the second access network device.

The determining module 902 is further configured to: based on the paging area configuration requirement parameter of the terminal device, determine a cell included in a paging area that is to be configured for the terminal device, and generate the paging area configuration information.

Optionally, in this embodiment of this application, after the determining module 902 generates the paging area configuration information based on the paging area configuration requirement parameter of the terminal device, the sending module 903 is further configured to send the paging area configuration information to the second access network device.

It should be understood that the access network device 900 according to this embodiment of this application may be corresponding to the first access network device in the embodiments of this application, and the foregoing and other operations and/or functions of the modules in the access network device 900 are intended to implement corresponding procedures of the methods in FIG. 4 and FIG. 5. For brevity, details are not described herein again.

Figure 10:
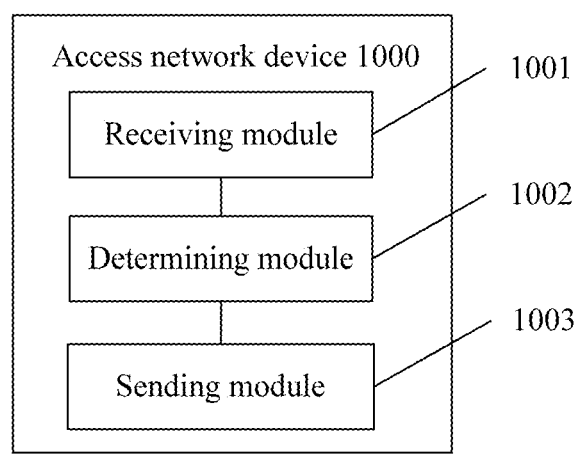
FIG. 10 is a schematic block diagram of an access network device according to an embodiment of this application.

FIG. 10 is a schematic block diagram of an access network device 1000 according to an embodiment of this application. As shown in FIG. 10, the access network device 1000 includes a receiving module 1001, a determining module 1002, and a sending module 1003.

The receiving module 1001 is configured to receive an instruction message sent by a first access network device, where the instruction message carries identifier information of the terminal device, and the instruction information is used to instruct the access network device to send information used to determine paging area configuration information to the first access network device.

The determining module 1002 is configured to determine the information used to determine the paging area configuration information.

The sending module 1003 is configured to send the information used to determine the paging area configuration information to the first access network device.

In an implementation, the receiving module 1001 is further configured to receive the instruction message that carries information about a candidate cell and that is sent by the first access network device, where the instruction message is used to instruct the access network device to determine a selected cell from the candidate cell.

The determining module 1002 is further configured to determine the selected cell based on the candidate cell.

The sending module 1003 is further configured to send information about the selected cell to the first access network device.

In another implementation, the receiving module 1001 is further configured to receive the instruction information sent by the first access network device, where the instruction message is used to instruct the access network device to determine to send a paging area configuration requirement parameter of the terminal device to the first access network device.

The determining module 1002 is further configured to determine the paging area configuration requirement parameter of the terminal device.

The sending module 1003 is further configured to send the paging area configuration requirement parameter of the terminal device to the first access network device.

Optionally, in this embodiment of this application, the receiving module 1001 is further configured to receive the paging area configuration information that is generated based on the paging area configuration requirement parameter of the terminal device and sent by the first access network device.

It should be understood that the access network device 1000 according to this embodiment of this application may be corresponding to the second access network device in the embodiments of this application, and the foregoing and other operations and/or functions of the modules in the access network device 1000 are intended to implement corresponding procedures of the methods in FIG. 4 and FIG. 5. For brevity, details are not described herein again.

Figure 11:
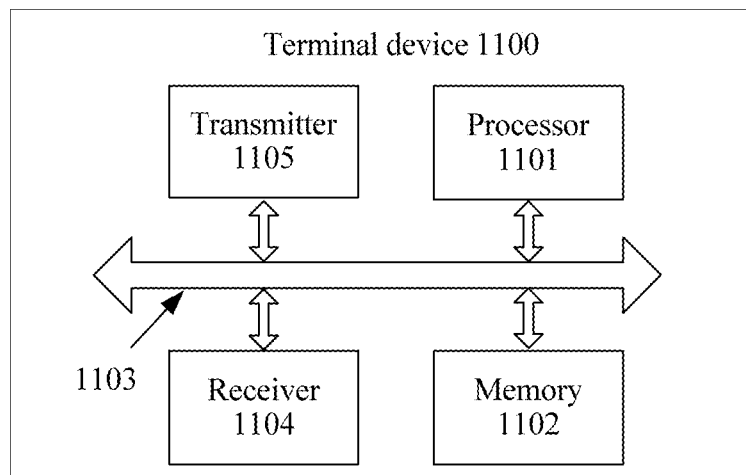
FIG. 11 is a schematic structural diagram of a terminal device according to an embodiment of this application.

FIG. 11 is a schematic structural diagram of a terminal device 1100 according to an embodiment of this application. As shown in FIG. 11, the terminal device 1100 includes a processor 1101, a memory 1102, a receiver 1104, a bus system 1103, and a transmitter 1105. The processor 1101, the memory 1102, the receiver 1104, and the transmitter 1105 may be connected using the bus system 1103. The memory 1102 is configured to store an instruction. The processor 1101 is configured to: execute the instruction stored in the memory 1102; and control the receiver 1104 to receive information, and control the transmitter 1105 to send information.

The processor 1101 is configured to determine that a paging area of the terminal device in a first state is changed.

In the first state, the terminal device monitors paging and has stored connection context information of the terminal device.

The transmitter 1105 is configured to send a first message to a first access network device, where the first message is used to notify the first access network device that the paging area of the terminal device is changed, and the first access network device is a serving access network device of the terminal device.

The receiver 1104 is configured to receive a second message sent by the first access network device based on the first message.

The processor 1101 is further configured to determine, based on the second message received by the receiver 1104, a to-be-entered state of the terminal device.

The processor 1101 is further configured to: when the processor 1101 determines that the terminal device needs to be in a second state, enter the second state based on the stored connection context information. In the second state, the terminal device and the first access network device are in a connected state.

It should be understood that the terminal device 1100 according to this embodiment of this application may be corresponding to the terminal device in the embodiments of this application, and the foregoing and other operations and/or functions of the modules in the terminal device 1100 are intended to implement corresponding procedures of the methods in FIG. 1 to FIG. 5. For brevity, details are not described herein again.

Figure 12:
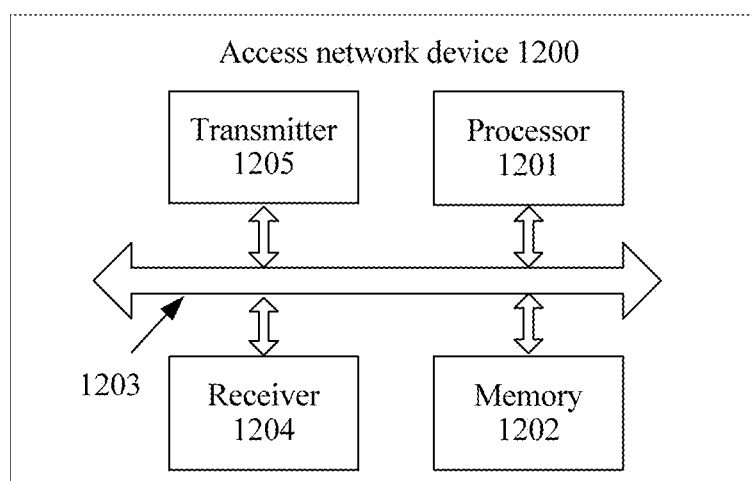
FIG. 12 is a schematic structural diagram of an access network device according to an embodiment of this application.

FIG. 12 is a schematic structural diagram of an access network device 1200 according to an embodiment of this application. As shown in FIG. 12, the access network device 1200 includes a processor 1201, a memory 1202, a receiver 1204, a bus system 1203, and a transmitter 1205. The processor 1201, the memory 1202, the receiver 1204, and the transmitter 1205 may be connected using the bus system 1203. The memory 1202 is configured to store an instruction. The processor 1201 is configured to: execute the instruction stored in the memory 1202; and control the receiver 1204 to receive information, and control the transmitter 1205 to send information.

The receiver 1204 is configured to receive a first message sent by a terminal device in a first state, where the first message is used to notify the access network device that a paging area of the terminal device is changed. In the first state, the terminal device monitors paging and the terminal device has stored connection context information of the terminal device.

The receiver 1204 is further configured to obtain the connection context information of the terminal device from a second access network device, where the second access network device is an access network device corresponding to a cell included in a paging area configured for the terminal device or is a predetermined access network device that is configured to store the connection context information of the terminal device.

The processor 1201 is configured to determine a to-be-entered state of the terminal device.

The transmitter 1205 is configured to: when it is determined that the terminal device needs to be in a second state, send, to the terminal device based on the connection context information of the terminal device, a second message that is used to instruct the terminal device to enter the second state.

It should be understood that the access network device 1200 according to this embodiment of this application may be corresponding to the first access network device in the embodiments of this application, and the foregoing and other operations and/or functions of the modules in the access network device 1200 are intended to implement corresponding procedures of the methods in FIG. 2 and FIG. 3. For brevity, details are not described herein again.

Figure 13:
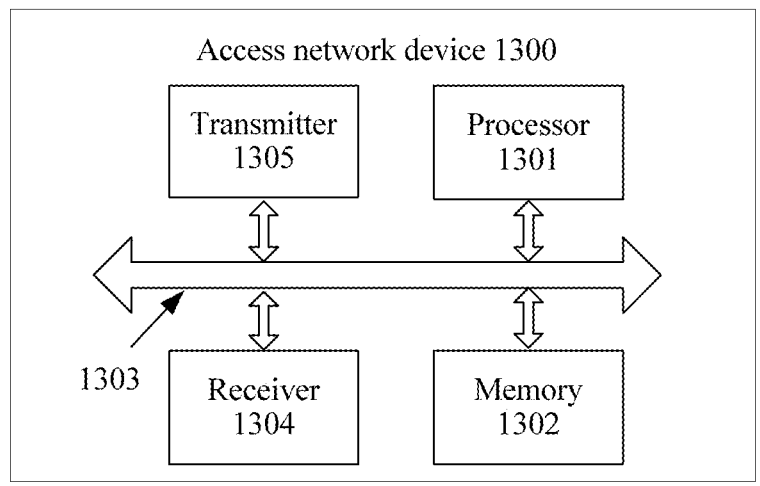
FIG. 13 is a schematic structural diagram of an access network device according to an embodiment of this application.

FIG. 13 is a schematic structural diagram of an access network device 1300 according to an embodiment of this application. As shown in FIG. 13, the access network device 1300 includes a processor 1301, a memory 1302, a receiver 1304, a bus system 1303, and a transmitter 1305. The processor 1301, the memory 1302, the receiver 1304, and the transmitter 1305 may be connected using the bus system 1303. The memory 1302 is configured to store an instruction. The processor 1301 is configured to: execute the instruction stored in the memory 1302; and control the receiver 1304 to receive information, and control the transmitter 1305 to send information.

The receiver 1304 is configured to receive a first instruction message sent by a first access network device, where the first instruction message carries identifier information of a terminal device to request connection context information of the terminal device, the first instruction message is sent by the first access network device after receiving a first message, the first message is used to notify the first access network device that a paging area of the terminal device is changed, and the first access network device is a serving access network device of the terminal device. In the first state, the terminal device monitors paging and the terminal device has stored the connection context information of the terminal device.

The processor 1301 is configured to determine the connection context information of the terminal device based on the identifier information of the terminal device.

The transmitter 1305 is configured to send a context transfer message to the first access network device, where the context transfer message includes the connection context information of the terminal device.

It should be understood that the access network device 1300 according to this embodiment of this application may be corresponding to the second access network device in the embodiments of this application, and the foregoing and other operations and/or functions of the modules in the access network device 1300 are intended to implement corresponding procedures of the methods in FIG. 2 and FIG. 3. For brevity, details are not described herein again.

Figure 14:
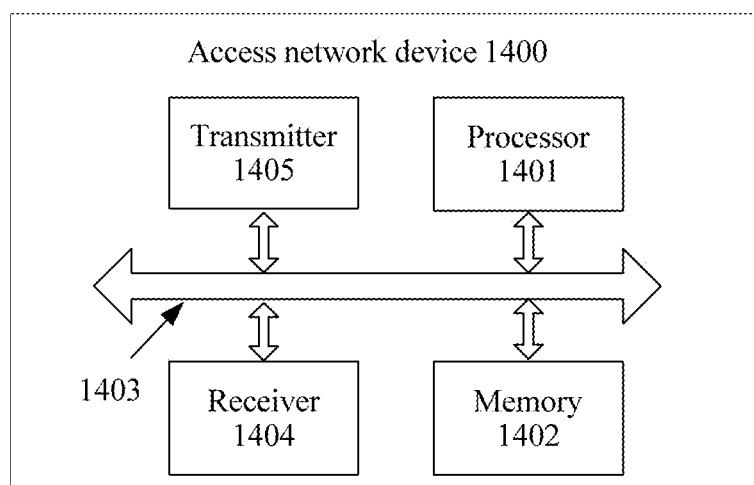
FIG. 14 is a schematic structural diagram of an access network device according to an embodiment of this application.

FIG. 14 is a schematic structural diagram of an access network device 1400 according to an embodiment of this application. As shown in FIG. 14, the access network device 1400 includes a processor 1401, a memory 1402, a receiver 1404, a bus system 1403, and a transmitter 1405. The processor 1401, the memory 1402, the receiver 1404, and the transmitter 1405 may be connected using the bus system 1403. The memory 1402 is configured to store an instruction. The processor 1401 is configured to: execute the instruction stored in the memory 1402; and control the receiver 1404 to receive information, and control the transmitter 1405 to send information.

The receiver 1404 is configured to receive a first message sent by a terminal device, where the first message is used to notify the access network device that a paging area of the terminal device is changed.

The processor 1401 is configured to determine paging area configuration information, where the paging area configuration information is used to update a paging area configuration for the terminal device.

The transmitter 1405 is configured to send, to the terminal device, a second message that includes the paging area configuration information.

It should be understood that the access network device 1400 according to this embodiment of this application may be corresponding to the first access network device in the embodiments of this application, and the foregoing and other operations and/or functions of the modules in the access network device 1400 are intended to implement corresponding procedures of the methods in FIG. 4 and FIG. 5. For brevity, details are not described herein again.

Figure 15:
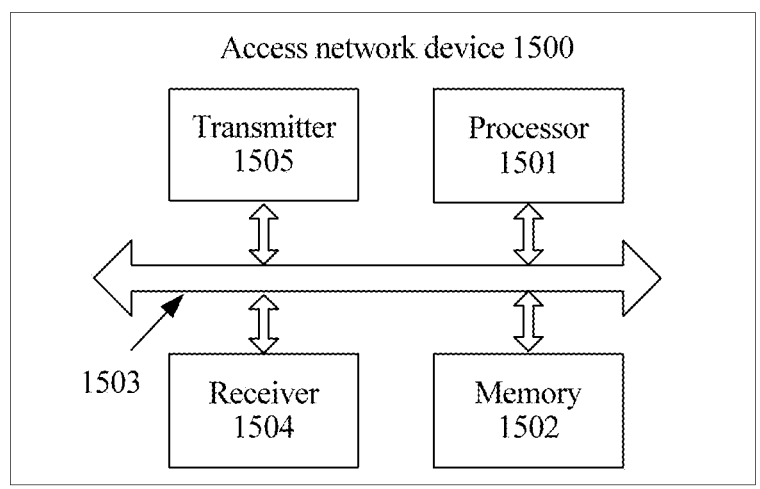
FIG. 15 is a schematic structural diagram of an access network device according to an embodiment of this application.

FIG. 15 is a schematic structural diagram of an access network device 1500 according to an embodiment of this application. As shown in FIG. 15, the access network device 1500 includes a processor 1501, a memory 1502, a receiver 1504, a bus system 1503, and a transmitter 1505. The processor 1501, the memory 1502, the receiver 1504, and the transmitter 1505 may be connected using the bus system 1503. The memory 1502 is configured to store an instruction. The processor 1501 is configured to: execute the instruction stored in the memory 1502; and control the receiver 1504 to receive information, and control the transmitter 1505 to send information.

The receiver 1504 is configured to receive an instruction message sent by a first access network device, where the instruction message carries identifier information of the terminal device, and the instruction information is used to instruct the access network device to send information used to determine paging area configuration information to the first access network device.

The processor 1501 is configured to determine the information used to determine the paging area configuration information.

The transmitter 1505 is configured to send the information used to determine the paging area configuration information to the first access network device.

It should be understood that the access network device 1500 according to this embodiment of this application may be corresponding to the second access network device in the embodiments of this application, and the foregoing and other operations and/or functions of the modules in the access network device 1500 are intended to implement corresponding procedures of the methods in FIG. 4 and FIG. 5. For brevity, details are not described herein again.

In the embodiments of this application, the processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA, generic array logic (GAL), or any combination thereof.

The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache.

In addition to a data bus, the bus system may further include a power bus, a control bus, a status signal bus, and the like. For ease of representation, only one thick line is used to represent the bus system in the figure, but this does not mean that there is only one bus or only one type of bus.

An embodiment of this application provides a computer readable medium, configured to store a computer program. The computer program includes instructions used to perform the communications method according to the embodiments of this application in FIG. 2 to FIG. 5. The readable medium may be a ROM or a RAM. This is not limited in this embodiment of this application.

It should be understood that the term "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use a different method to implement the described functions for each particular application, but it should not be considered that the implementation goes beyond the scope of this application.

It may be clearly understood by a person skilled in the art that for the purpose of convenient and brief description, for detailed working processes of the foregoing described system, apparatus, and unit, reference may be made to corresponding processes in the foregoing method embodiments, and details are not described herein again.

In the several embodiments provided in this application, it should be understood that the disclosed system, apparatus, and method may be implemented in other manners. For example, the foregoing described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electronic, mechanical, or other forms.

The units described as separate parts may or may not be physically separate, and parts displayed as units may or may not be physical units. In other words, they may be located in one place, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (that may be a personal computer, a server, a network device, or the like) to perform all or some of the steps of the methods described in the embodiments of this application. The storage medium includes: any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:
   determining, by a terminal device in an inactive state, that a paging area of the terminal device has changed, wherein the inactive state is a state in which the terminal device monitors for a paging message and the terminal device stores connection context information of the terminal device;
   sending, by the terminal device, a first message to a first access network device serving the terminal device, wherein the first message notifies the first access network device that the paging area of the terminal device has changed, and wherein sending, by the terminal device, the first message comprises:
      sending, by the terminal device, the first message on a first signaling channel of a common channel;
   receiving, by the terminal device, a second message sent by the first access network device, wherein receiving, by the terminal device, the second message comprises:
      activating, by the terminal device based on a signaling channel parameter in the connection context information of the terminal device, a second signaling channel of a dedicated channel; and
      receiving, by the terminal device, the second message on the second signaling channel of the dedicated channel;
   determining, by the terminal device based on the second message, a to-be-entered state of the terminal device; and
   when the to-be-entered state is a connected state between the terminal device and the first access network device, entering, by the terminal device, the connected state.

2. The method according to claim 1, further comprising:
   when the terminal device determines that the to-be-entered state is the inactive state, remaining, by the terminal device, in the inactive state.

3. The method according to claim 1, wherein determining, by the terminal device based on the second message, the to-be-entered state of the terminal device comprises:
   determining, by the terminal device based on a type of the second message, the to-be-entered state of the terminal device.

4. The method according to claim 1, wherein the second message carries paging area configuration information, and the paging area configuration information is used to update a paging area configuration for the terminal device.

5. A terminal device, comprising:
   a processor, configured to:
      determine that a paging area of the terminal device has changed while the terminal is in an inactive state, wherein the inactive state is a state in which the terminal device monitors for a paging message and the terminal device stores connection context information of the terminal device; and activate, based on a signaling channel parameter in the connection context information of the terminal device, a second signaling channel of a dedicated channel;

a transmitter, configured to send a first message to a first access network device serving the terminal device, wherein the first message notifies the first access network device that the paging area of the terminal device has changed, and wherein the transmitter is configured to send the first message on a first signaling channel of a common channel; and a receiver, configured to receive a second message sent by the first access network device, wherein the second message is received on the second signaling channel of the dedicated channel; and wherein the processor is further configured to:
determine, based on the second message, a to-be-entered state of the terminal device; and
when the to-be-entered state is a connected state between the terminal device and the first access network device, enter the connected state.

6. The terminal device according to claim 5, wherein the processor is further configured to:
when the terminal device determines that the to-be-entered state is the inactive state, remain in the inactive state.

7. The terminal device according to claim 5, wherein the processor being configured to determine, based on the second message, the to-be-entered state of the terminal device, comprises the processor being configured to:
determine, based on a type of the second message, the to-be-entered state of the terminal device.

8. The terminal device according to claim 7, wherein the second message carries paging area configuration information, and the paging area configuration information is used to update a paging area configuration for the terminal device.

9. A method, comprising:
receiving, by a first access network device, a first message sent by a terminal device in an inactive state, wherein the first message notifies the first access network device that a paging area of the terminal device has changed, wherein the inactive state is a state in which the terminal device monitors for a paging message and the terminal device stores connection context information of the terminal device, and wherein receiving, by the first access network device, the first message comprises:
receiving, by the first access network device, the first message on a first signaling channel of a common channel;
determining, by the first access network device, a to-be-entered state of the terminal device; and
when the to-be-entered state is a connected state between the terminal device and the first access network device, sending, by the first access network device to the terminal device, a second message instructing the terminal device to enter the connected state, wherein sending, by the first access network device to the terminal device, the second message comprises:
activating, by the first access network device based on the connection context information of the terminal device, a second signaling channel of a dedicated channel; and
sending, by the first access network device, the second message on the second signaling channel.

10. The method according to claim 9, further comprising:
when the first access network device determines that the to-be-entered state is the inactive state, sending, by the first access network device to the terminal device, a second message instructing the terminal device to remain in the inactive state.

11. The method according to claim 9, wherein the second message instructs the terminal device to enter the connected state using a type of the second message.

12. The method according to claim 11, wherein the second message carries paging area configuration information; and the paging area configuration information is used to update a paging area configuration for the terminal device.

13. The method according to claim 9, further comprising:
obtaining, by the first access network device from a second access network device, the connection context information of the terminal device, wherein the second access network device corresponds to a cell comprised in a paging area configured for the terminal device, or is a predetermined access network device configured to store the connection context information of the terminal device, and wherein the second message is sent by the first access network device according to the connection context information of the terminal device.

14. A first access network device, comprising:
a receiver, configured to receive a first message sent by a terminal device in an inactive state, wherein the first message notifies the first access network device that a paging area of the terminal device has changed, and wherein the inactive state is a state in which the terminal device monitors for a paging message and the terminal device stores connection context information of the terminal device, and the receiver is configured to receive the first message on a first signaling channel of a common channel;
a processor, configured to:
determine a to-be-entered state of the terminal device; and
activate, based on the connection context information of the terminal device, a second signaling channel of a dedicated channel; and
a transmitter, configured to, when the to-be-entered state is a connected state between the terminal device and the first access network device, send, to the terminal device, a second message instructing the terminal device to enter the connected state, and wherein the transmitter is configured to send the second message on the second signaling channel of the dedicated channel.

15. The first access network device according to claim 14, wherein the transmitter is further configured to, when the first access network device determines that the to-be-entered state is the inactive state, send, to the terminal device, a second message instructing the terminal device to remain in the inactive state.

16. The first access network device according to claim 14, wherein the second message instructs the terminal device to enter the connected state using a type of the second message.

17. The first access network device according to claim 16, wherein the second message carries paging area configuration information; and the paging area configuration information is used to update a paging area configuration for the terminal device.

18. The first access network device according to claim 14, wherein the processor is further configured to:
obtain the connection context information of the terminal device from a second access network device, wherein the second access network device corresponds to a cell comprised in a paging area configured for the terminal device, or is a predetermined access network device configured to store the connection context information of the terminal device, and wherein the transmitter sends the second message based on the connection context information of the terminal device.

\* \* \* \* \*